(12) United States Patent
Li et al.

(10) Patent No.: US 11,619,815 B2
(45) Date of Patent: Apr. 4, 2023

(54) OPTICAL COMBINER INCLUDING POLARIZATION-SELECTIVE ELEMENTS AND SWITCHABLE HALF-WAVE PLATES FOR PUPIL STEERING

(71) Applicant: META PLATFORMS TECHNOLOGIES, LLC, Menlo Park, CA (US)

(72) Inventors: Gang Li, Bothell, WA (US); Changwon Jang, Bellevue, WA (US); Giseung Bang, Redmond, WA (US); Andrew Maimone, Duvall, WA (US); Mengfei Wang, Seattle, WA (US); Afsoon Jamali, Redmond, WA (US); Lu Lu, Kirkland, WA (US); Hao Yu, Kent, OH (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 10 days.

(21) Appl. No.: 16/733,092

(22) Filed: Jan. 2, 2020

(65) Prior Publication Data
US 2021/0208396 A1    Jul. 8, 2021

(51) Int. Cl.
*G02B 27/01* (2006.01)
(52) U.S. Cl.
CPC .. *G02B 27/0172* (2013.01); *G02B 2027/0174* (2013.01); *G02B 2027/0178* (2013.01); *G02B 2027/0194* (2013.01)
(58) Field of Classification Search
CPC ........ G02B 27/0172; G02B 2027/0174; G02B 2027/0178; G02B 2027/0194;
(Continued)

(56) References Cited

U.S. PATENT DOCUMENTS 6,661,495 B1 * 12/2003 Popovich ............. C09K 19/544
349/1
10,338,451 B2    7/2019 Shi et al.
(Continued)

FOREIGN PATENT DOCUMENTS

WO    2019185510 A1    10/2019
WO    2020112527 A1    6/2020

OTHER PUBLICATIONS

International Search Report and Written Opinion, PCT/US2020/061479, dated Feb. 26, 2021, 11 pgs.
(Continued)

*Primary Examiner* — Thomas K Pham
*Assistant Examiner* — Henry A Duong
(74) *Attorney, Agent, or Firm* — Morgan, Lewis & Bockius LLP

(57) ABSTRACT

An optical assembly includes a beam steering device and a holographic optical element. The beam steering device is switchable between different states including a first state and a second state. The beam steering device includes a first polarization-selective optical element and a first tunable optical retarder optically coupled with the first polarization-selective optical element. The holographic optical element is positioned relative to the beam steering device for receiving light from the beam steering device and projecting a first light pattern while the beam steering device is in the first state and a second light pattern distinct from the first light pattern while the beam steering device is in the second state.

18 Claims, 20 Drawing Sheets

(58) Field of Classification Search
CPC ..... G02B 5/3016; G02B 5/1833; G02F 1/292; G03H 1/0005; G03H 2001/0077; G03H 2001/0439
USPC .......................................................... 359/15
See application file for complete search history.

(56) References Cited

U.S. PATENT DOCUMENTS

| | | | |
|---|---|---|---|
| 2012/0188467 A1* | 7/2012 | Escuti | G02F 1/1347 349/1 |
| 2020/0166754 A1* | 5/2020 | Leister | G02B 5/3083 |
| 2021/0011300 A1* | 1/2021 | Leister | G02B 27/022 |

OTHER PUBLICATIONS

International Preliminary Report on Patentability for International Application No. PCT/US2020/061479, dated Jul. 14, 2022, 10 pages.

* cited by examiner

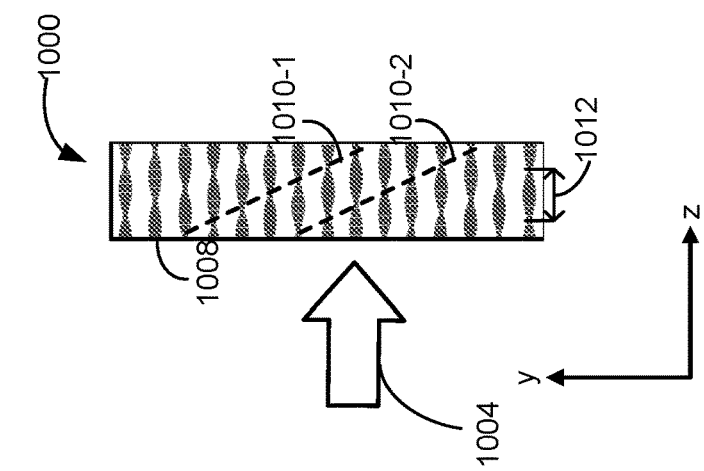
Figure 10C
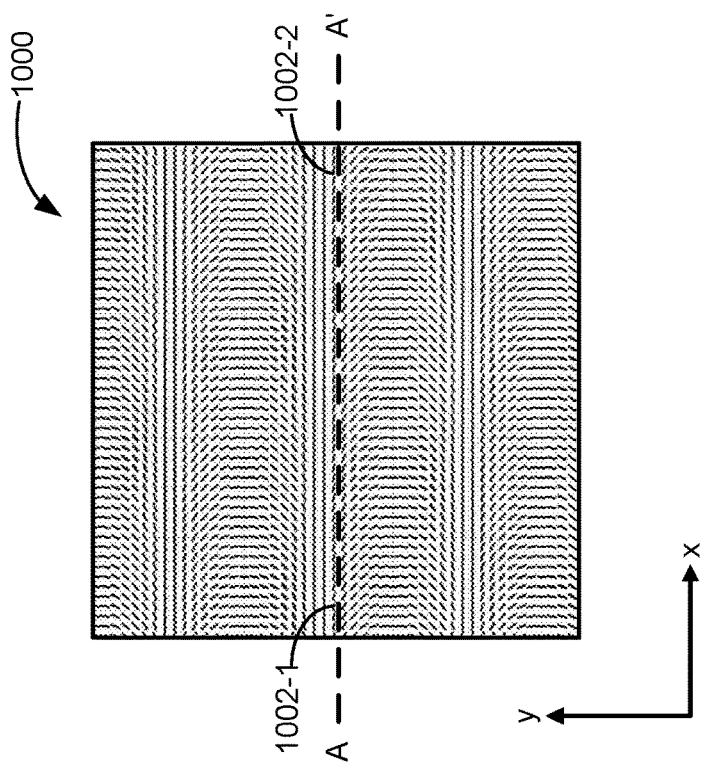
Figure 10B
Figure 10D
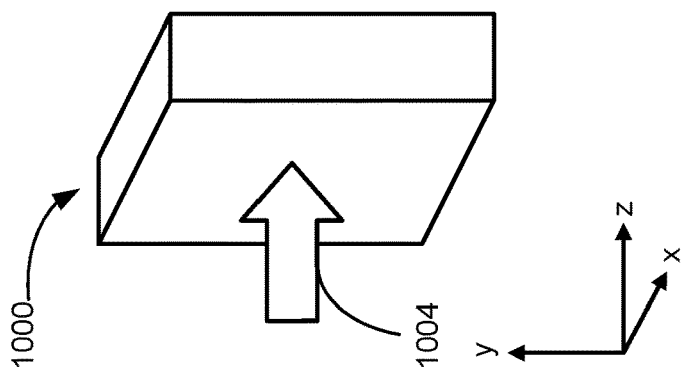
Figure 10A

OPTICAL COMBINER INCLUDING POLARIZATION-SELECTIVE ELEMENTS AND SWITCHABLE HALF-WAVE PLATES FOR PUPIL STEERING

TECHNICAL FIELD

This relates generally to display devices, and more specifically to head-mounted display devices.

BACKGROUND

Head-mounted display devices (also called herein head-mounted displays) are gaining popularity as means for providing visual information to a user. For example, the head-mounted display devices are used for virtual reality and augmented reality operations.

Conventional head-mounted display devices (e.g., conventional head-mounted display devices configured for augmented reality operations) project images over a large area around an eye of a user in order to provide a wide field of view in all gaze-directions (e.g., in order to deal with pupil steering). However, projecting images over a large area leads to reduced brightness of the projected images. Compensating for the reduced brightness typically requires a high intensity light source, which is typically large and heavy, and has high power consumption.

Therefore, there is a need for head-mounted displays that are compact and light, thereby enhancing the user's virtual reality and/or augmented reality experience.

SUMMARY

The above deficiencies and other problems associated with conventional head-mounted displays are reduced or eliminated by the disclosed display devices including optical assemblies for pupil steering.

In accordance with some embodiments, an optical assembly includes a beam steering device and a holographic optical element. The beam steering device is switchable between different states including a first state and a second state. The beam steering device includes a first polarization-selective optical element and a first tunable optical retarder optically coupled with the first polarization-selective optical element. The holographic optical element is positioned relative to the beam steering device for receiving light from the beam steering device and projecting a first light pattern while the beam steering device is in the first state and a second light pattern distinct from the first light pattern while the beam steering device is in the second state.

In accordance with some embodiments, a display device including the optical assembly described above, a light source, and a spatial light modulator. The spatial light modulator is positioned so that the spatial light modulator receives light output by the light source and projects the light toward the optical assembly.

In accordance with some embodiments, a method is performed at an optical assembly including a holographic optical element and a beam steering device switchable between different states including a first state and a second state. The beam steering device includes a first polarization-selective optical element and a first tunable optical retarder optically coupled with the first polarization-selective optical element. The method includes receiving, by the holographic optical element, light from the beam steering device. The method also includes projecting, by the holographic optical element, a first light pattern while the beam steering device is in the first state and a second light pattern distinct from the first light pattern while the beam steering device is in the second state.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 10A-10D are schematic diagrams illustrating a polarization volume holographic grating in accordance with some embodiments.

Figure 1:
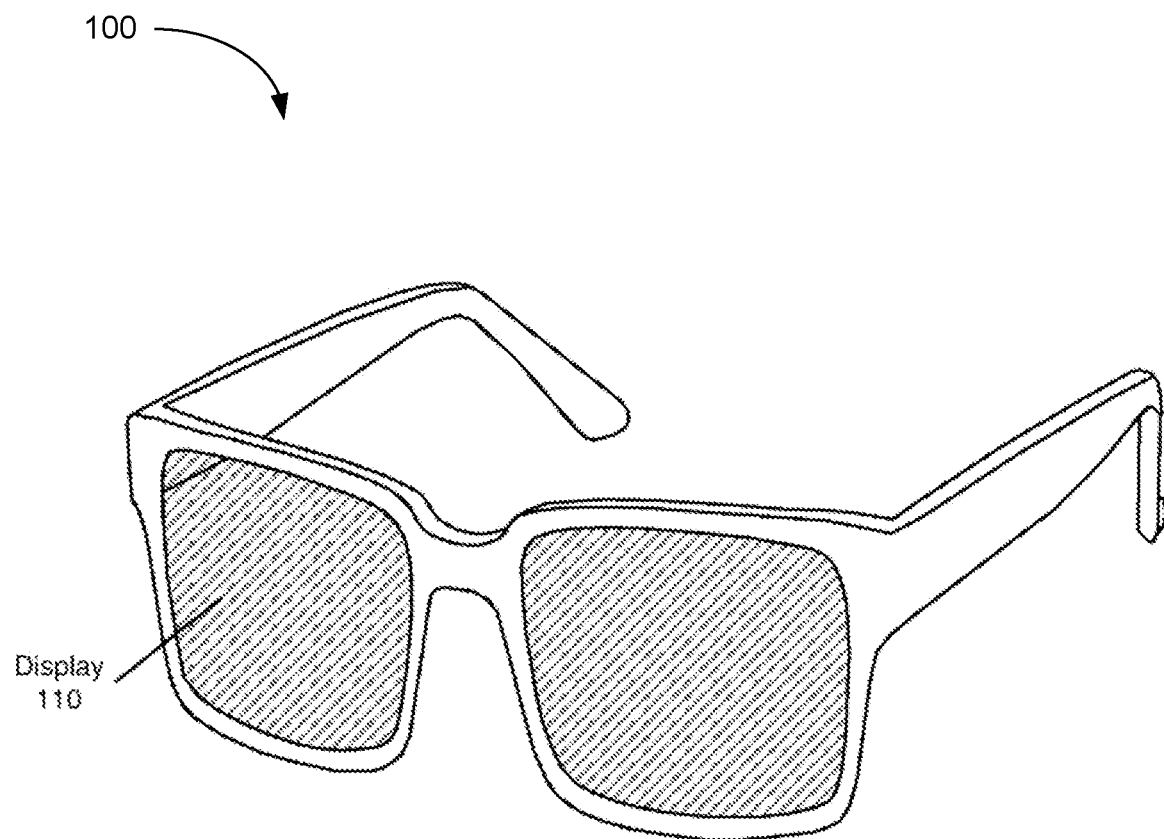
FIG. 1 is a perspective view of a display device in accordance with some embodiments.

These figures are not drawn to scale unless indicated otherwise.

DETAILED DESCRIPTION

Utilizing optical elements (e.g., combiners or reflective displays) that project computer-generated images allows augmented and virtual reality operations. In order to provide images to a pupil regardless of a movement of the pupil, conventional combiners and reflectors project images onto a large eyebox (e.g., an eyebox having a characteristic dimension, such as a diameter or a width, of at least 1 cm). However, when light is projected onto a large eyebox, a significant portion of the light lands on an area outside the pupil. This leads to decreased brightness of the projected images. Instead of increasing the power of light source devices in displays, which increases the size, weight, and power consumption of head-mounted displays, images are projected onto a small eyebox (e.g., an eyebox that corresponds to a size of the pupil), thereby improving the brightness of the projected images. To accommodate for the movement of the pupil and reduce vignetting of the projected light, the projected light is steered toward the pupil using the disclosed optical assemblies.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first retarder could be termed a second retarder, and, similarly, a second retarder could be termed a first retarder, without departing from the scope of the various described embodiments. The first retarder and the second retarder are both retarders, but they are not the same retarder. Similarly, a first direction could be termed a second direction, and, similarly, a second direction could be termed a first direction, without departing from the scope of the various described embodiments. The first direction and the second direction are both directions, but they are not the same direction.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 illustrates display device 100 in accordance with some embodiments. In some embodiments, display device 100 is configured to be worn on a head of a user (e.g., by having the form of spectacles or eyeglasses, as shown in FIG. 1) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user). As shown in FIG. 1, display device 100 includes display 110. Display 110 is configured for presenting visual contents (e.g., augmented reality contents, virtual reality contents, mixed reality contents, or any combination thereof) to a user.

Figure 2:
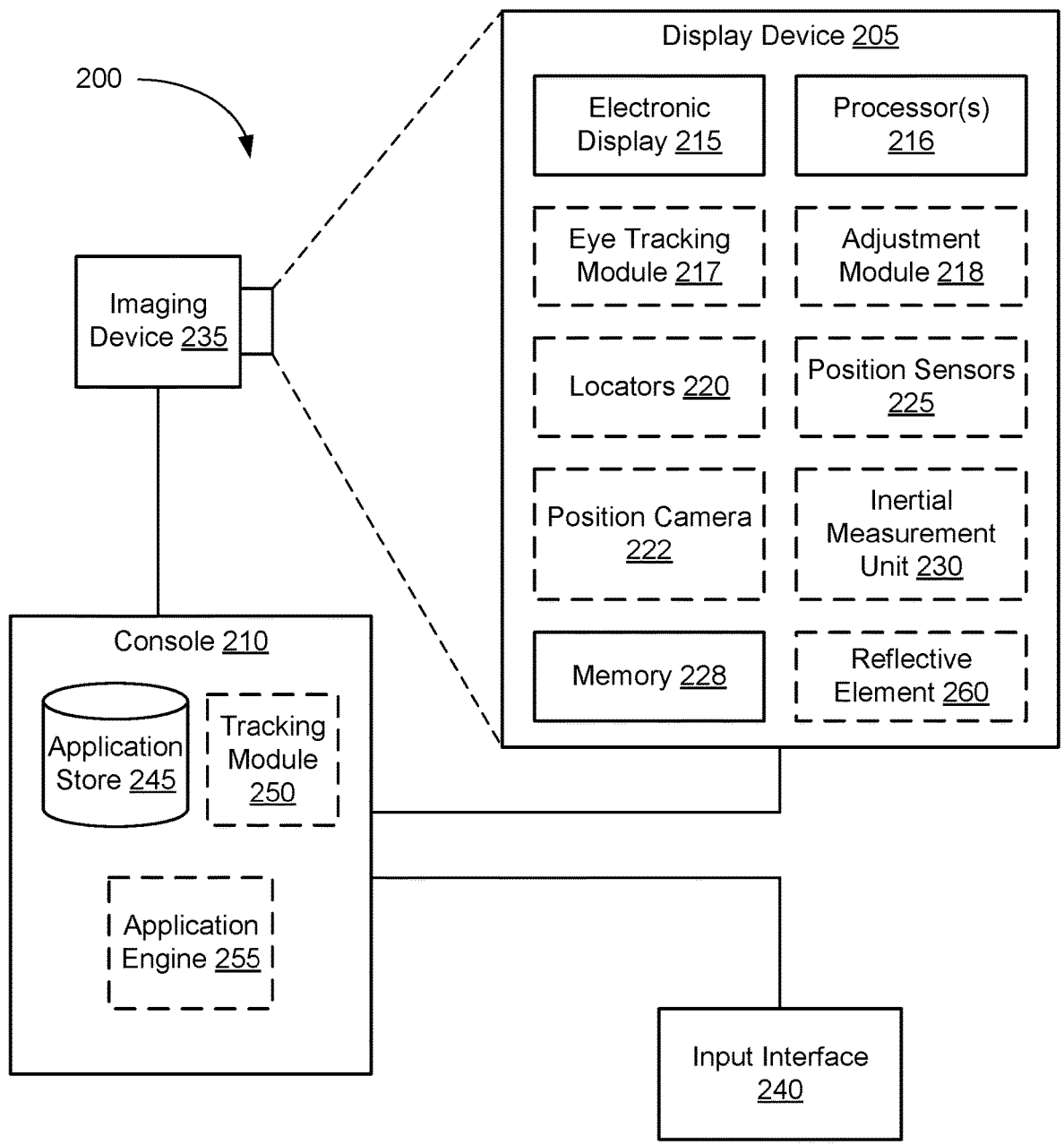
FIG. 2 is a block diagram of a system including a display device in accordance with some embodiments.

In some embodiments, display device 100 includes one or more components described herein with respect to FIG. 2. In some embodiments, display device 100 includes additional components not shown in FIG. 2.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including one display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver augmented reality, virtual reality, and mixed reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in an augmented environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an augmented reality (AR) device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, one or more reflective elements 260 or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable display element or multiple adjustable display elements (e.g., a display for each eye of a user). In some embodiments, electronic display 215 is configured to display images to the user by projecting the images onto one or more reflective elements 260.

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind one or more lenses. In some embodiments, the spatial light modulator is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array. In some embodiments, electronic display 215 projects images to one or more reflective elements 260, which reflect at least a portion of the light toward an eye of a user.

One or more lenses direct light from the arrays of light emission devices (optionally through the emission intensity arrays) to locations within each eyebox and ultimately to the back of the user's retina(s). An eyebox is a region that is occupied by an eye of a user located proximity to display device 205 (e.g., a user wearing display device 205) for viewing images from display device 205. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed. As used herein, IR refers to light with wavelengths ranging from 700 nm to 1 mm including near infrared (NIR) ranging from 750 nm to 1500 nm.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described herein.

Adjustment module 218 generates an image frame based on the determined locations of the pupils. In some embodiments, this sends a discrete image to the display that will tile subimages together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 500 nm to 750 nm), in the infrared band (e.g., about 750 nm to 1 mm), in the ultraviolet band (about 100 nm to 500 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

In some embodiments, display device 205 optionally includes one or more reflective elements 260. In some embodiments, electronic display device 205 optionally includes a single reflective element 260 or multiple reflective elements 260 (e.g., a reflective element 260 for each eye of a user). In some embodiments, electronic display device 215 projects computer-generated images on one or more reflective elements 260, which, in turn, reflect the images toward an eye or eyes of a user. The computer-generated images include still images, animated images, and/or a combination thereof. The computer-generated images include objects that appear to be two-dimensional and/or three-dimensional objects. In some embodiments, one or more reflective elements 260 are partially transparent (e.g., the one or more reflective elements 260 have a transmittance of at least 15%, 20%, 25%, 30%, 35%, 50%, 55%, or 50%), which allows transmission of ambient light. In such embodiments, computer-generated images projected by electronic display 215 are superimposed with the transmitted ambient light (e.g., transmitted ambient image) to provide augmented reality images.

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described herein may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in an augmented environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

Figure 3:
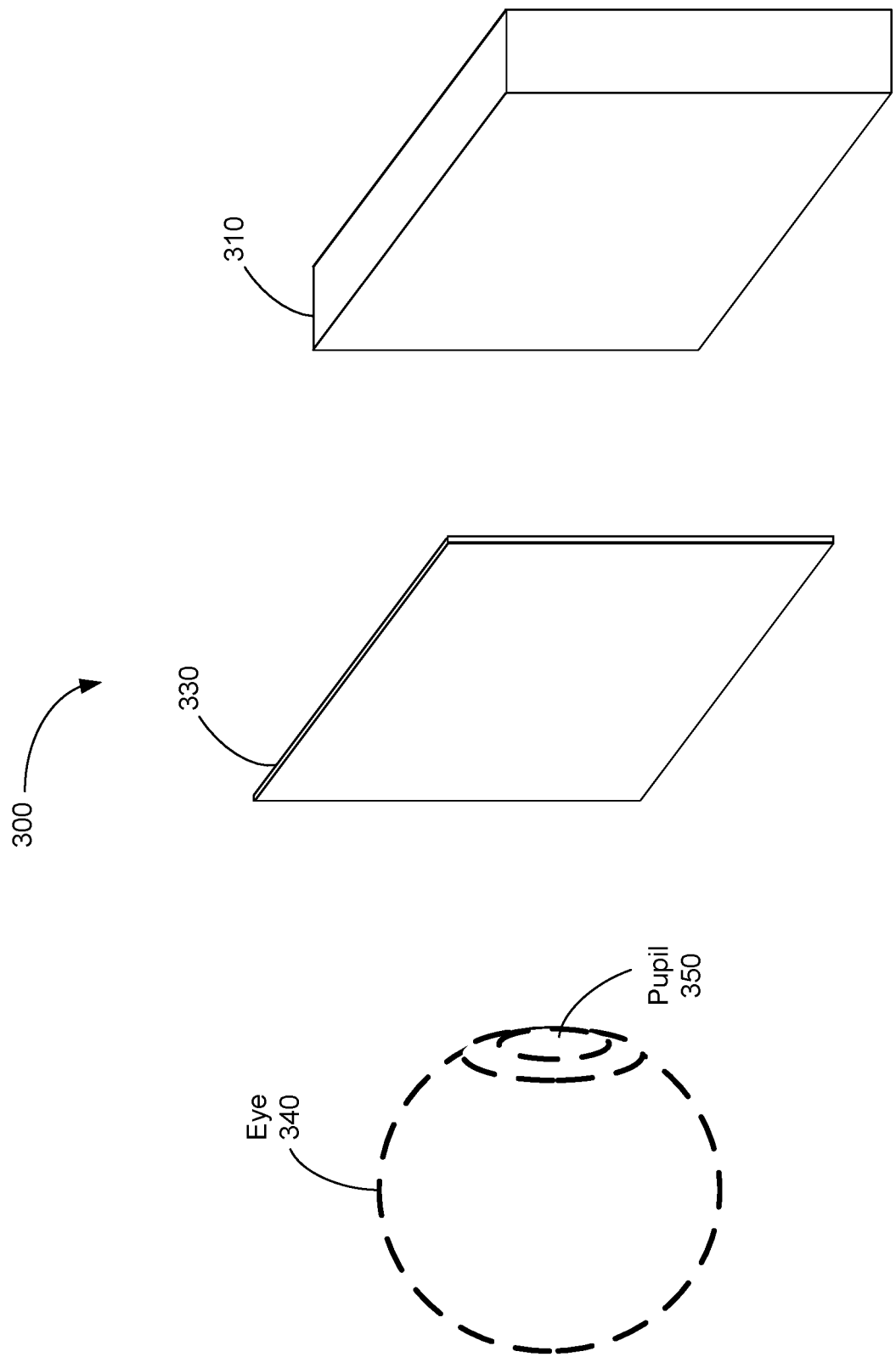
FIG. 3 is an isometric view of a display device in accordance with some embodiments.

FIG. 3 is an isometric view of display device 300 in accordance with some embodiments. In some other embodiments, display device 300 is part of some other electronic display (e.g., a digital microscope, a head-mounted display device, etc.). In some embodiments, display device 300 includes light emission device 310 and an optical assembly 330, which may include one or more lenses and/or other optical components. In some embodiments, display device 300 also includes an IR detector array.

Light emission device 310 emits image light and optional IR light toward the viewing user. Light emission device 310 includes one or more light emission components that emit light in the visible light (and optionally includes components that emit light in the IR). Light emission device 310 may include, e.g., an array of LEDs, an array of microLEDs, an array of organic LEDs (OLEDs), an array of superluminescent LEDs (sLEDS) or some combination thereof.

In some embodiments, light emission device 310 includes an emission intensity array (e.g., a spatial light modulator) configured to selectively attenuate light emitted from light emission device 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to provide image light and/or control what portion of the image light is passed to the optical assembly 330. In some embodiments, display device 300 uses the emission intensity array to facilitate providing image light to a location of pupil 350 of eye 340 of a user, and minimize the amount of image light provided to other areas in the eyebox.

The optical assembly 330 includes one or more lenses. The one or more lenses in optical assembly 330 receive modified image light (e.g., attenuated light) from light emission device 310, and direct the modified image light to a location of pupil 350. The optical assembly 330 may include additional optical components, such as color filters, mirrors, etc.

An optional IR detector array detects IR light that has been retro-reflected from the retina of eye 340, a cornea of eye 340, a crystalline lens of eye 340, or some combination thereof. The IR detector array includes either a single IR sensor or a plurality of IR sensitive detectors (e.g., photodiodes). In some embodiments, the IR detector array is separate from light emission device array 310. In some embodiments, the IR detector array is integrated into light emission device array 310.

In some embodiments, light emission device 310 including an emission intensity array make up a display element. Alternatively, the display element includes light emission device 310 (e.g., when light emission device array 310 includes individually adjustable pixels) without the emission intensity array. In some embodiments, the display element additionally includes the IR array. In some embodiments, in response to a determined location of pupil 350, the display element adjusts the emitted image light such that the light output by the display element is refracted by one or more lenses toward the determined location of pupil 350, and not toward other locations in the eyebox.

In some embodiments, display device 300 includes one or more broadband sources (e.g., one or more white LEDs) coupled with a plurality of color filters, in addition to, or instead of, light emission device 310.

Figure 4A:
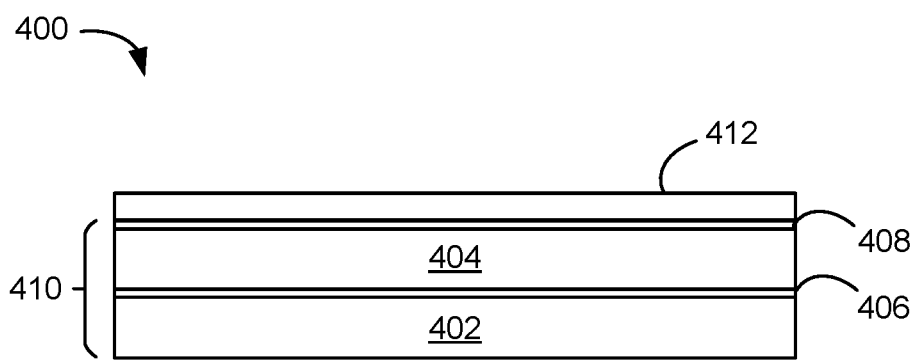
FIG. 4A is a schematic diagram illustrating a cross-sectional top of a beam steerer in accordance with some embodiments.

FIG. 4A is a schematic diagram illustrating a cross-sectional view (or a side view) of a beam steerer 400 in accordance with some embodiments. Beam steerer 400 includes a stack (e.g., stack 410) of polarization-selective gratings (e.g., polarization-selective gratings 406 and 408) and tunable retarders (e.g., tunable retarders 402 and 404) and holographic optical element (HOE) 412. In FIG. 4A, each polarization-selective grating is coupled with a tunable retarder. For example, stack 410 in FIG. 4A includes polarization-selective gratings 406 and 408 coupled with respective tunable retarders 402 and 404. In some embodiments, stack 410 includes one or more polarization-selective gratings-tunable retarder pairs (e.g., 1, 2, 3, 4, or 5 pairs). As shown, tunable retarders 402 and 404, polarization-selective gratings 406 and 408, and HOE 412 are disposed parallel or substantially parallel to each other (e.g., forming an angle of 5 degrees or less, 10 degrees or less, 15 degrees or less, or 20 degrees or less). In some embodiments, a polarization-selective grating is in direct contact with a respective tunable retarder. Alternatively, the polarization-selective grating is separate from the respective tunable retarder. In some embodiments, all components of beam steerer 400 are in direct contact with their respective adjacent components such that beam steerer 400 forms a continuous stack. For example, as shown in FIG. 4A, polarization-selective grating 406 is in direct contact with tunable retarders 402 and 404 and polarization-selective grating 408 is in direct contact with tunable retarder 404 and HOE 412. Alternatively, all or some of the components of beam steerer 400 are separate from their adjacent components (e.g., polarization-selective grating 406 may be separated from tunable retarder 402 and tunable retarder 404).

HOE 412 includes a holographically recorded medium (e.g., a holographic film). HOE 412 is configured to project (e.g., by reflecting) a plurality of light patterns depending on, for example, an incident angle of light illuminating HOE 412. In some embodiments, HOE 412 receives light in a first incident angle range and projects the light as a first light pattern, and receives light in a second incident angle range distinct from the first incident angle and projects the light as a second light pattern distinct from the first light pattern. In some embodiments, the first light pattern and the second light pattern are distinct and mutually exclusive. For example, HOE 412 receives light only at a particular incident angle range at a time (e.g., at a first incident angle range or at second incident angle range) and projects the received light as a particular light pattern (e.g., as the first light pattern or the second light pattern). In some embodiments, the first light pattern is directed toward a first region of an eyebox (e.g., an area that is occupied by eye 340 in FIG. 3) and the second light pattern is directed toward a second region distinct from (and mutually exclusive to) the first region of the eyebox.

Tunable retarders 402 and 404 (e.g., tunable half-wave plates) are switchable between two or more distinct states. In some embodiments, tunable retarders 402 and 404 include liquid crystals (e.g., nematic liquid crystals or chiral nematic liquid crystals). The liquid crystals are switchable between distinct states (e.g., two states) by, for example, altering a voltage applied across tunable retarders 402 and 404. An applied voltage controls orientation and/or alignment of liquid crystals. In some embodiments, while a first voltage differential is applied across a tunable retarder, the liquid crystals (and the tunable retarder containing the liquid crystals) are in a first state, and while a second voltage differential (e.g., no voltage differential) distinct from the first voltage differential is applied across the tunable retarder, the liquid crystals (and the tunable retarder containing the liquid crystals) are in a second state distinct from the first state. In some embodiments, while a third voltage differential distinct from the first voltage differential and the second voltage differential is applied across the tunable retarder, the liquid crystals (and the tunable retarder containing the liquid crystals) are in a third state distinct from the first state and the second state. The first state, the second state, and the third state are distinct from each other. The state of the liquid crystals (and the corresponding state of the tunable retarder) determines how the tunable retarder interacts with incident light. Tunable retarders 402 and 404 may independently modulate polarization of light passing through tunable retarders 402 and 404. For example, a tunable retarder may operate as substrate with no polarization retardation while the tunable retarder is in the first state (e.g., an "off" state) and operate as a half-wave plate while the tunable retarder is in the second state (e.g., an "on" state). As a result, while the tunable retarder is in the first state, the tunable retarder does not modify the polarization of the light transmitted through the tunable retarder and while the tunable retarder is in the second state, the tunable retarder modifies the polarization of the light transmitted through the tunable retarder (e.g., by changing handedness of circularly polarized light). Alternatively, a tunable retarder may operate as a half-wave plate while the tunable retarder is in the first state (e.g., "off" state) and operate as a substrate with no polarization retardation while the tunable retarder is in the second state (e.g., an "on" state).

In some embodiments, a polarization-selective optical element (e.g., polarization-selective grating 406 and 408) is a thin film coated on a surface of a respective tunable retarder (e.g., tunable retarders 402 and 404).

In some embodiments, at least one of polarization-selective gratings 406 and 408 is a polarization volume hologram (PVH) grating (e.g., PVH grating 1000 described with respect to FIGS. 10A-10D). A PVH grating is selective with respect to polarization handedness, incident angle, and/or wavelength range of light incident thereon. For example, a PVH grating may transmit light having a first circular polarization and does not change its direction or polarization (regardless of its incident angle or wavelength) and redirect (e.g., diffract) light having a second circular polarization that is within a particular range of incident angles (e.g., orthogonal to the first circular polarization) and within a particular range of wavelengths while converting the polarization of the redirected light to the first circular polarization (e.g., the first circular polarization corresponds to right-handed circular polarization and the second circular polarization corresponds to left-handed circular polarization, or vice versa). In some embodiments, the PVH grating does not transmit a substantial portion (e.g., more than 80%, 90%, 95%, or 99%) of light having the second circular polarization that is within the particular range of incident angles and within the particular range of wavelengths. In some embodiments, the PVH grating may transmit light having an incident angle outside the particular range of incident angles (regardless of its polarization or wavelength). In some embodiments, the PVH grating may transmit light having a wavelength outside the particular wavelength range (regardless of its polarization or incident angle). In some embodiments, both polarization-selective gratings 406 and 408 are polarization volume hologram (PVH) gratings.

In some embodiments, at least one of polarization-selective gratings 406 and 408 is a cholesteric liquid crystal (CLC) grating. Similar to a PVH, a CLC grating is selective with respect to circular polarization, incident angle, and/or wavelength range of light incident thereon. For example, a CLC grating may transmit light having a first circular polarization without changing its direction or polarization and redirect (e.g., diffract) light having a second circular polarization that is orthogonal to the first circular polarization while converting the polarization of the redirected light to the first circular polarization. In some embodiments, both polarization-selective gratings 406 and 408 are cholesteric liquid crystal (CLC) gratings.

In some embodiments, at least one of polarization-selective gratings 406 and 408 is a switchable Bragg grating including holographic polymer/dispersed liquid crystal materials. In some embodiments, polarization-selective gratings 406 and 408 are polarization-selective elements including metasurfaces, polarization-selective elements including resonant structured surfaces, polarization-selective elements including continuous chiral layers, or polarization-selective elements including birefringent materials. In some embodiments, both polarization-selective gratings 406 and 408 are switchable Bragg gratings.

Beam steerer 400 is switchable between different states depending on states of the one or more tunable retarders (e.g., tunable retarders 402 and 404). Each state provides a distinct light pattern reflected off HOE 412. A number of states of beam steerer 400 is determined based at least on a number of tunable retarders in stack 410. In some embodiments, the number of states of beam steerer 400 (with PVH or CLC gratings) equals the number of tunable retarders plus one (e.g., n+1, where n is the number of tunable retarders in stack 410). For example, beam steerer 400 including stack 410 with two tunable retarders 402 and 404 has three (3=2+1) distinct states. The states of beam steerer 400 are based on a combination of states of tunable retarders 402 and 404. For example, when tunable retarder 402 is in "off" state and tunable retarder 404 is in "off" state, beam steerer 400 is in a first state; when tunable retarder 402 is in "on" state and tunable retarder 404 is in "on" state, beam steerer 400 is in a second state; and when tunable retarder 402 is in "on" state and tunable retarder 404 is in "off" state, beam steerer 400 is in a third state. In some embodiments, a beam steerer state corresponding to tunable retarder 402 being in "off" state and tunable retarder 404 being in "on" state may provide light in a same direction as the beam steerer in the first state because of incident angle selectivity of PVH and CLC gratings. Therefore, in some embodiments, beam steerer 400 with two tunable retarders effectively has three distinct states providing three distinct patterns of light from HOE 412. Propagation of light in beam steerer 400 is described in further detail below with respect to FIGS. 7A-7C.

Figure 4B:
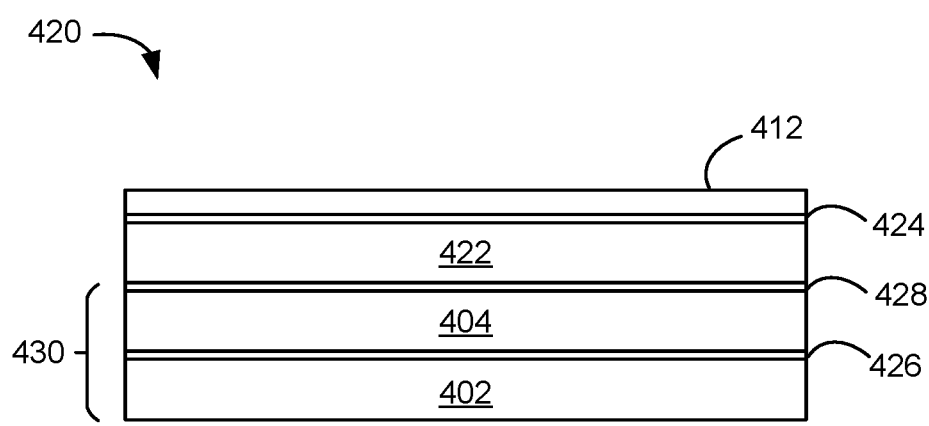
FIG. 4B is a schematic diagram illustrating a cross-sectional top of a beam steerer in accordance with some embodiments.

FIG. 4B is a schematic diagram illustrating a cross-sectional view (or a side view) of beam steerer 420 in accordance with some embodiments. Beam steerer 420 is similar to beam steerer 400 described with respect to FIG. 4A, except that beam steerer 400 includes stack 430 including polarization-selective gratings 428 and 426. In some embodiments, polarization-selective optical elements 428 and 426 are Pancharatnam-Berry phase (PBP) gratings (also known as geometric phase gratings) (e.g., PBP gratings 1100 described with respect to FIGS. 11A-11D). A PBP grating is selective with respect to polarization handedness and/or wavelength range of light incident thereon. For example, a PBP grating may diffract light having a first circular polarization in a first direction (e.g., in a direction corresponding to a first positive order of diffraction) and diffract light having a second circular polarization that is orthogonal to the first circular polarization in a second direction that is different from the first direction (e.g., in a direction corresponding to first negative order of diffraction). In addition, the PBP grating converts the polarization of the diffracted light such that light having the first circular polarization is diffracted as light having the second circular polarization and light having the second circular polarization is diffracted as light having the first circular polarization.

In some embodiments, beam steerer 420 further includes an optional tunable retarder (e.g., tunable retarder 422) and an optional retarder 424 (e.g., a quarter-wave plate). In FIG. 4B, tunable retarder 422 and optional retarder 424 are parallel to tunable retarders 402 and 404, polarization-selective gratings 426 and 428, and HOE 412. In some embodiments, retarder 424 is in direct contact with HOE 412 and disposed between tunable retarder 422 and HOE 412. In some embodiments, tunable retarder 422 is in direct contract with polarization-selective grating 428.

Beam steerer 420 is switchable between different states depending on states of the one or more tunable retarders. A number of states of beam steerer 420 is determined based at least on a number of tunable retarders in stack 430. In some embodiments, the number of states of beam steerer 420 (with PBP gratings) equals to two to the power of the number of tunable retarders (e.g., $2^n$, where n is the number of tunable retarders in stack 430). For example, beam steerer 420 including stack 430 with two tunable retarders 402 and 404 has four ($4=2^2$) distinct states. For example, when tunable retarder 402 is in "off" state and tunable retarder 404 is in "off" state, beam steerer 420 is in the first state; when tunable retarder 402 is in "on" state and tunable retarder 404 is in "on" state, beam steerer 420 is in the second state; when tunable retarder 402 is in "on" state and tunable retarder 404 is in "off" state, beam steerer 420 is in the third state; and when tunable retarder 402 is in "off" state and tunable retarder 404 is in "on" state, beam steerer 400 is in the fourth state. Each state of beam steerer 420 provides a distinct light pattern reflected off HOE 412. Propagation of light in beam steerer 420 is described in further detail below with respect to FIGS. 8A-8E.

FIGS. 5A-5E are schematic diagrams illustrating cross-sectional views (or side views) of beam steerer 500 in different modes in accordance with some embodiments. Beam steerer 500 is similar to beam steerer 400 described above with respect to FIG. 4A, including stack 410 and HOE 412. In FIGS. 5A-5E, each pair of a tunable retarder and a polarization-selective grating is illustrated with a single line so as not to obscure other aspects of beam steerer 500 (e.g., a pair of tunable retarder 402 and polarization-selective grating 406 is illustrated with a single line and a pair of tunable retarder 404 and polarization-selective grating 408 is illustrated with a separate line).

In FIGS. 5A-5E, beam steerer 500 is optically coupled with spatial light modulator (SLM) 502 that is positioned away from optical axis 501 of beam steerer 500. In some embodiments, SLM 502 is positioned away from projection of beam steerer 500 along optical axis 501 (e.g., SLM 502 is positioned diagonally from beam steerer 500 so that SLM 502 is not located at least partially within projection of beam steerer 500 along optical axis 501). As described above with respect to FIG. 2, a SLM includes an array of electro-optic pixels, opto-electronic pixels, some other array of devices that dynamically adjust the amount or phase of light transmitted by each device, or some combination thereof. SLM 502 receives light 505 from a light source (e.g., one or more LEDs, microLEDs, OLEDs, or sLEDS) and projects light 505 as modulated light 506 toward beam steerer 500.

Figure 5A:
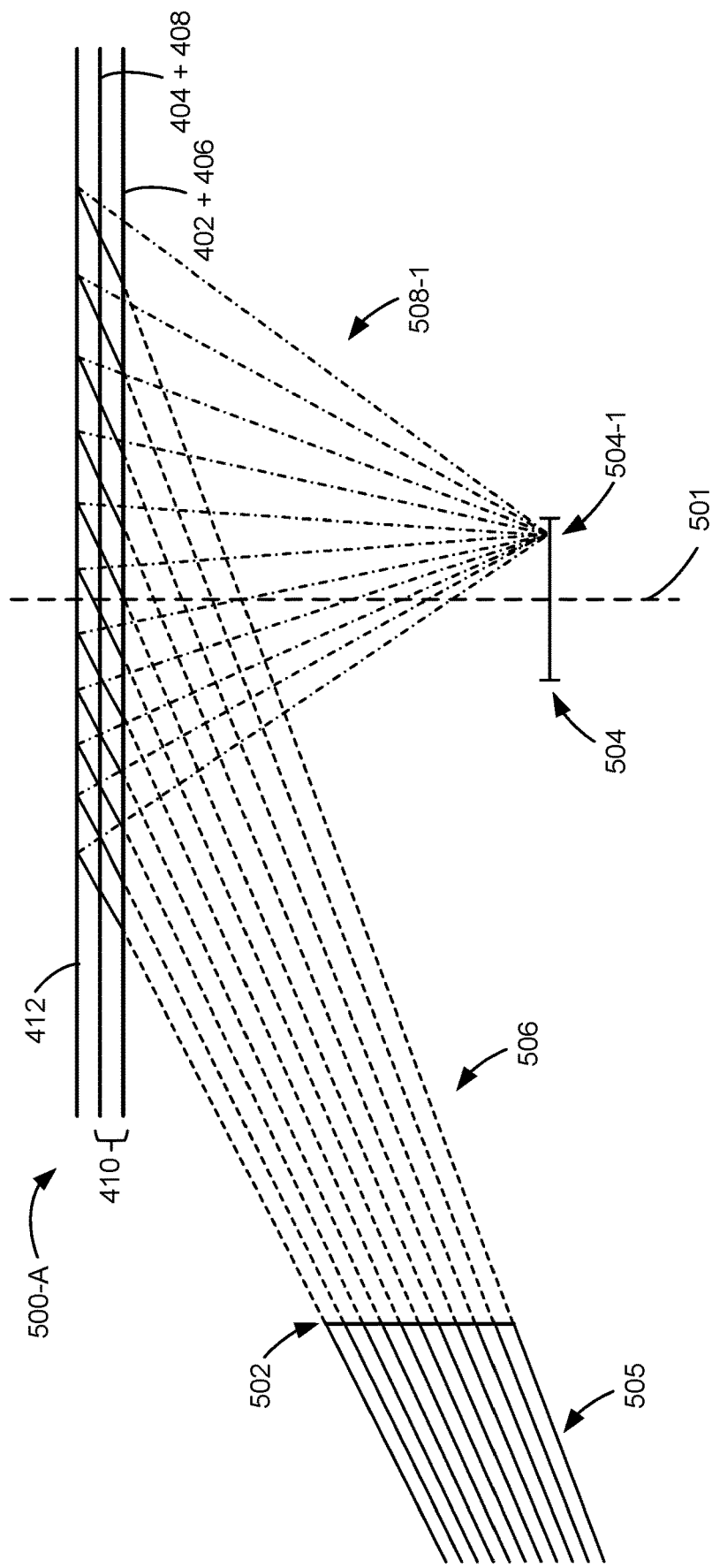
FIGS. 5A-5E are schematic diagrams illustrating cross-sectional views of a beam steerer in different modes in accordance with some embodiments.

In FIG. 5A, beam steerer 500 is in a first state (labeled as beam steerer 500-A). Beam steerer 500-A receives modulated light 506 and redirects modulated light 506 as light pattern 508-1 toward eyebox 504 such that light pattern 508-1 from beam steerer 500-A illuminates region 504-1 of eyebox 504. As described above with respect to FIG. 2, an eyebox is a region to which an image is projected. As a result, an eye located within the eyebox will view images from the display device. In some embodiments, the eyebox corresponds to (or encompasses) an entire area of a pupil of an eye of a user (e.g., pupil 350 of eye 340 in FIG. 3) at different rotational positions of the eye. Region 504-1 of eyebox 504 corresponds to an area of the pupil when the eye is in a first rotational position and light pattern 508-1 is configured to illuminate region 504-1 when the eye is in the first rotational position. Region 504-1 illuminated by beam steerer 500 is smaller than an area of the entire eyebox. In some embodiments, eyebox 504 has a diameter of approximately 10 mm (e.g., between 8 mm and 12 mm).

Figure 5B:
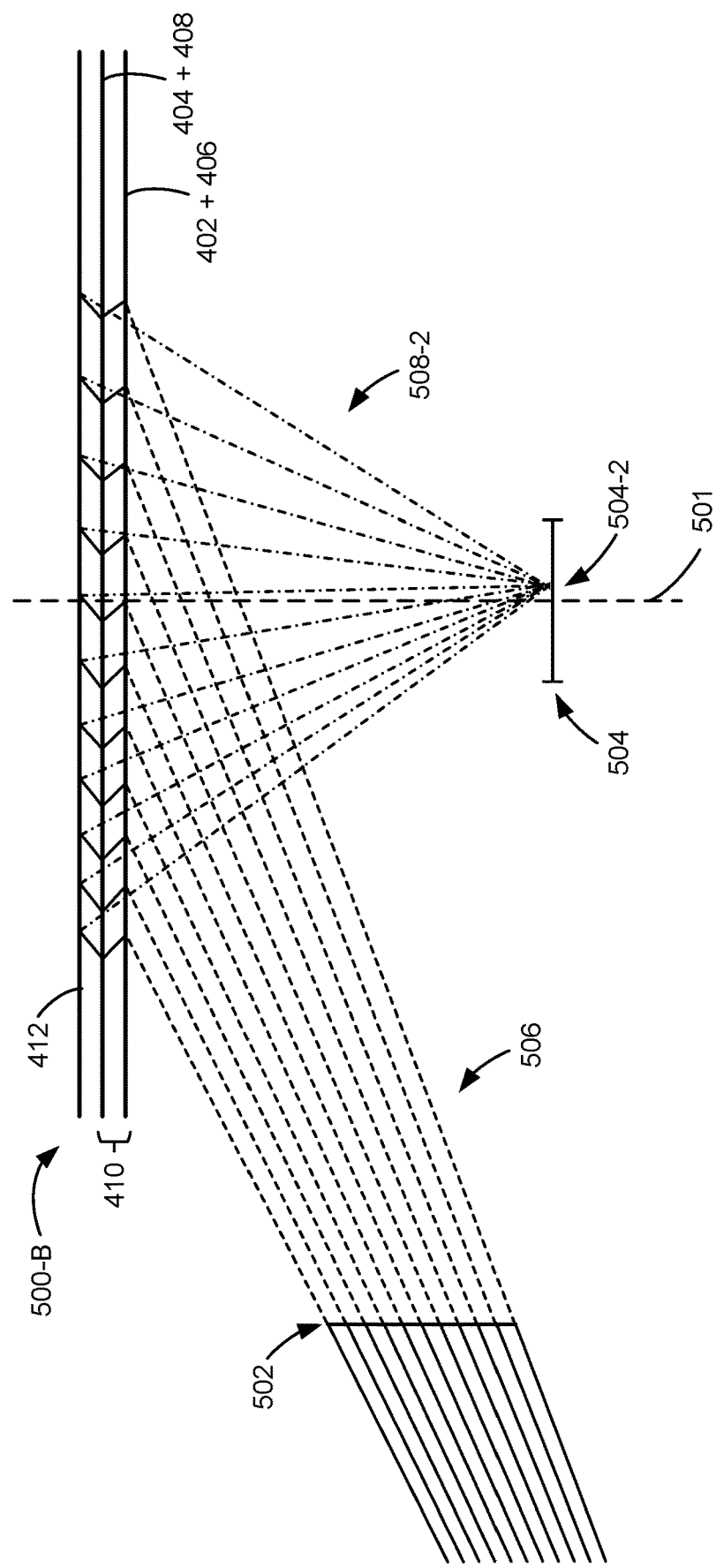

In FIG. 5B, beam steerer 500 is in a second state (labeled as beam steerer 500-B). Beam steerer 500-B receives modulated light 506 and redirects modulated light 506 as light pattern 508-2 toward eyebox 504 such that light pattern 508-2 from beam steerer 500-B illuminates region 504-2 of eyebox 504. Region 504-2 of eyebox 504 corresponds to an area of the pupil when the eye is in a second rotational position distinct from the first rotational position and light pattern 508-2 is configured to illuminate region 504-2 when the eye is in the second rotational position.

Figure 5C:
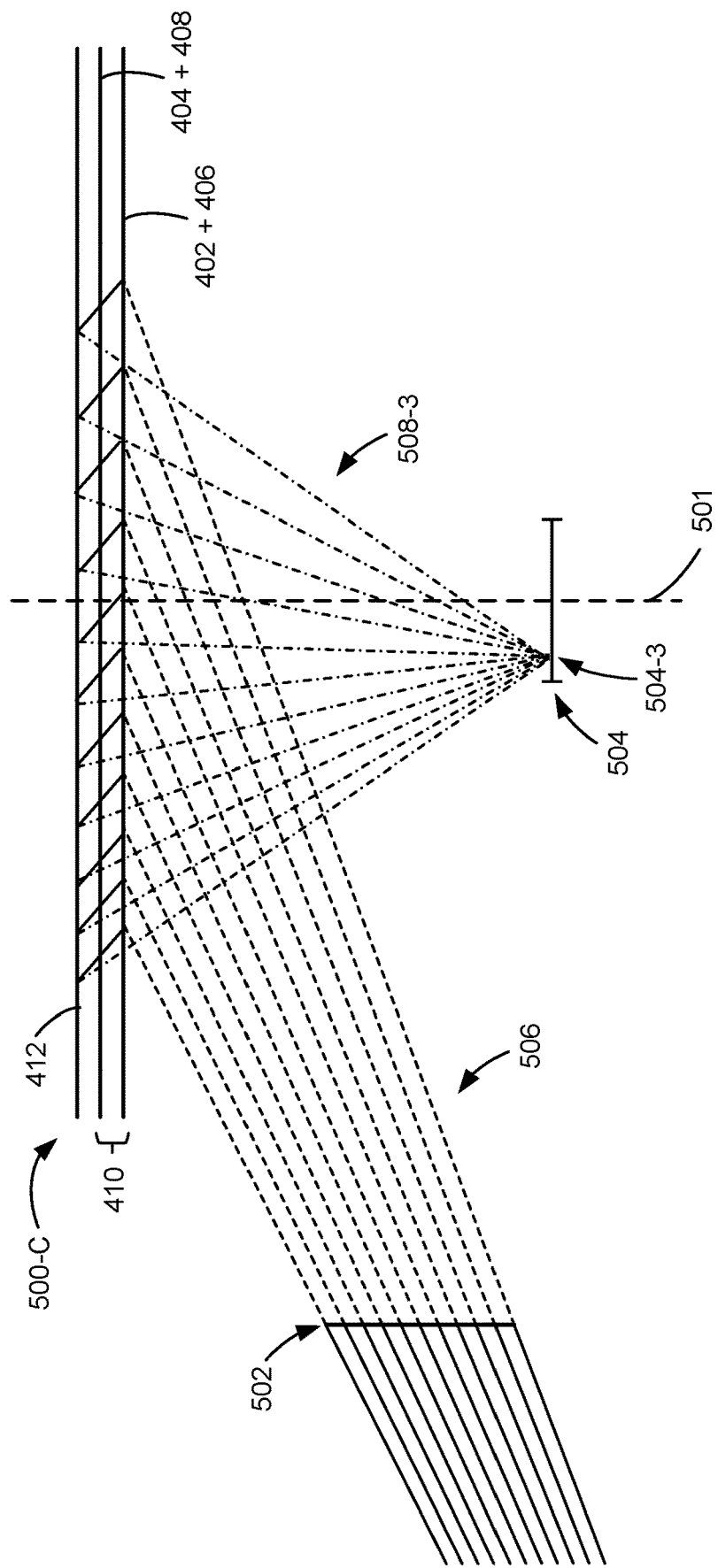

In FIG. 5C, beam steerer 500 is in a third state (labeled as beam steerer 500-C). Beam steerer 500-C receives modulated light 506 and redirects modulated light 506 as light pattern 508-3 toward eyebox 504 such that light pattern 508-3 from beam steerer 500-C illuminates region 504-3 of eyebox 504. Region 504-3 of eyebox 504 corresponds to an area of the pupil when the eye is in a third rotational position distinct from the first and the second rotational positions and light pattern 508-3 is configured to illuminate region 504-3 when the eye is in the third rotational position.

Figure 5D:
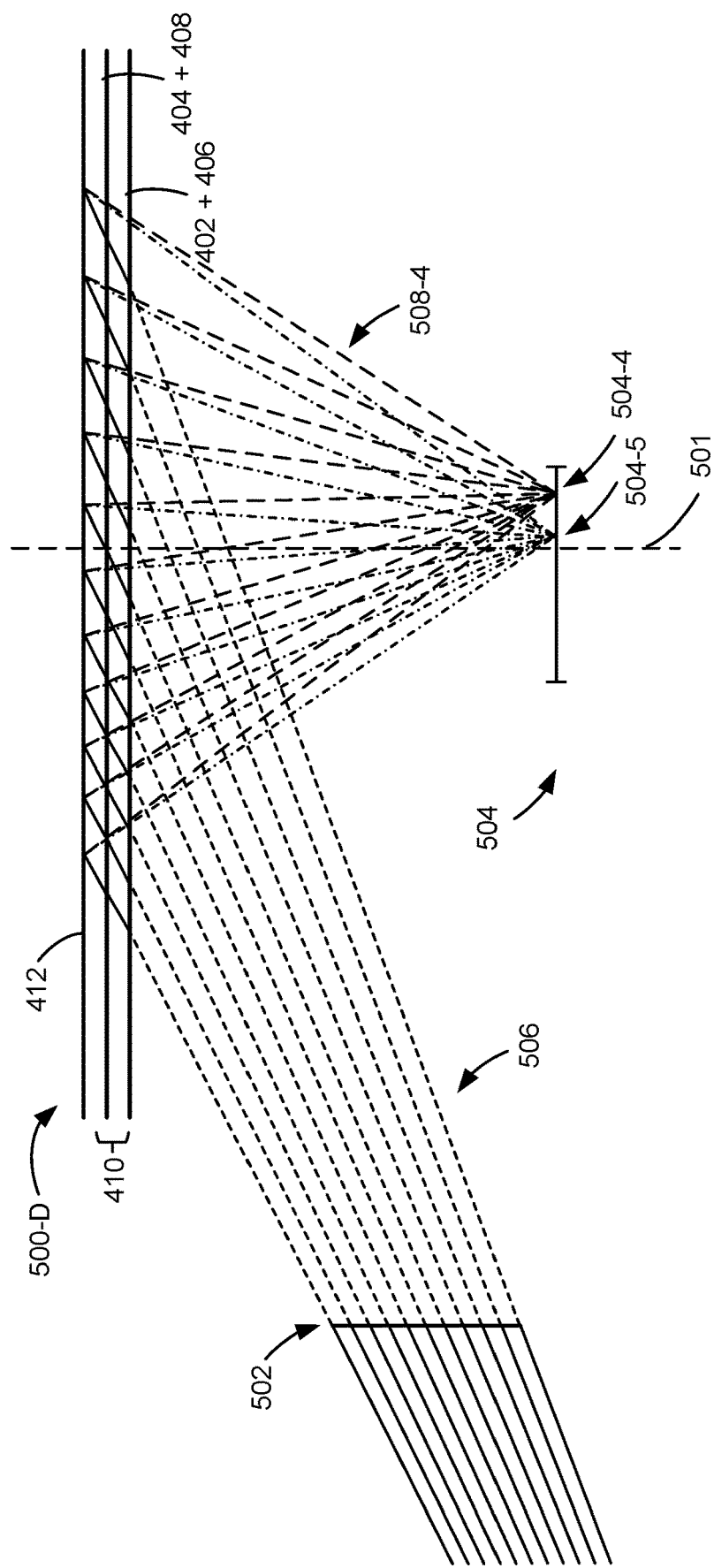
Figure 5E:
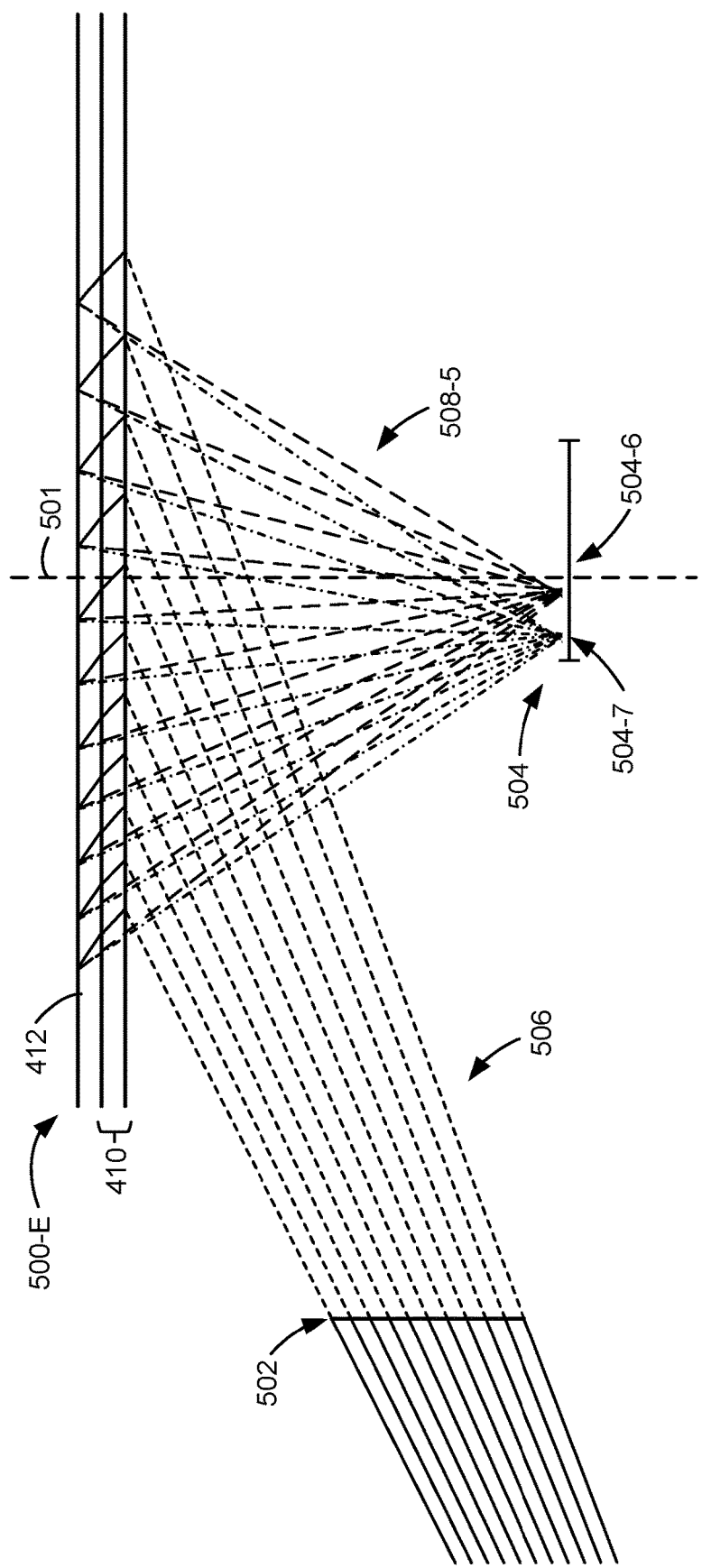

In some embodiments, a light pattern formed by HOE 412 illuminates two or more regions of eyebox 504. In FIG. 5D, beam steerer 500 is in a fourth state (labeled as beam steerer 500-D). Beam steerer 500-D receives modulated light 506 and redirects modulated light 506 as light pattern 508-4 toward eyebox 504 such that light pattern 508-4 illuminates region 504-4 and region 504-5 of eyebox 504. In FIG. 5E, beam steerer 500 is in a fifth state (labeled as beam steerer 500-E). Beam steerer 500-E receives modulated light 506 and redirects modulated light 506 as light pattern 508-5 toward eyebox 504 such that light pattern 508-5 illuminates region 504-6 and region 504-7 of eyebox 504. In some embodiments, two or more of regions 504-1, 504-2, 504-3, 504-4, 505-5, 504-6, and 504-7 are distinct from one another. In some embodiments, two or more of regions 504-1, 504-2, 504-3, 504-4, 505-5, 504-6, and 504-7 are separate from one another. In some embodiments, two or more of regions 504-1, 504-2, 504-3, 504-4, 505-5, 504-6, and 504-7 partially overlap one another.

In FIGS. 5A-5E, eyebox 504 is represented as a planar area (e.g., eyebox 504 is a square). However, the light patterns described with respect to FIGS. 5A-5E may also illuminate regions of eyebox 504 at different depths (e.g., different regions of eyebox 504 have different distances to beam steerer 500) such that eyebox 504 covers positions of the pupil in three dimensions for multiple rotational positions of the eye.

Figure 6:
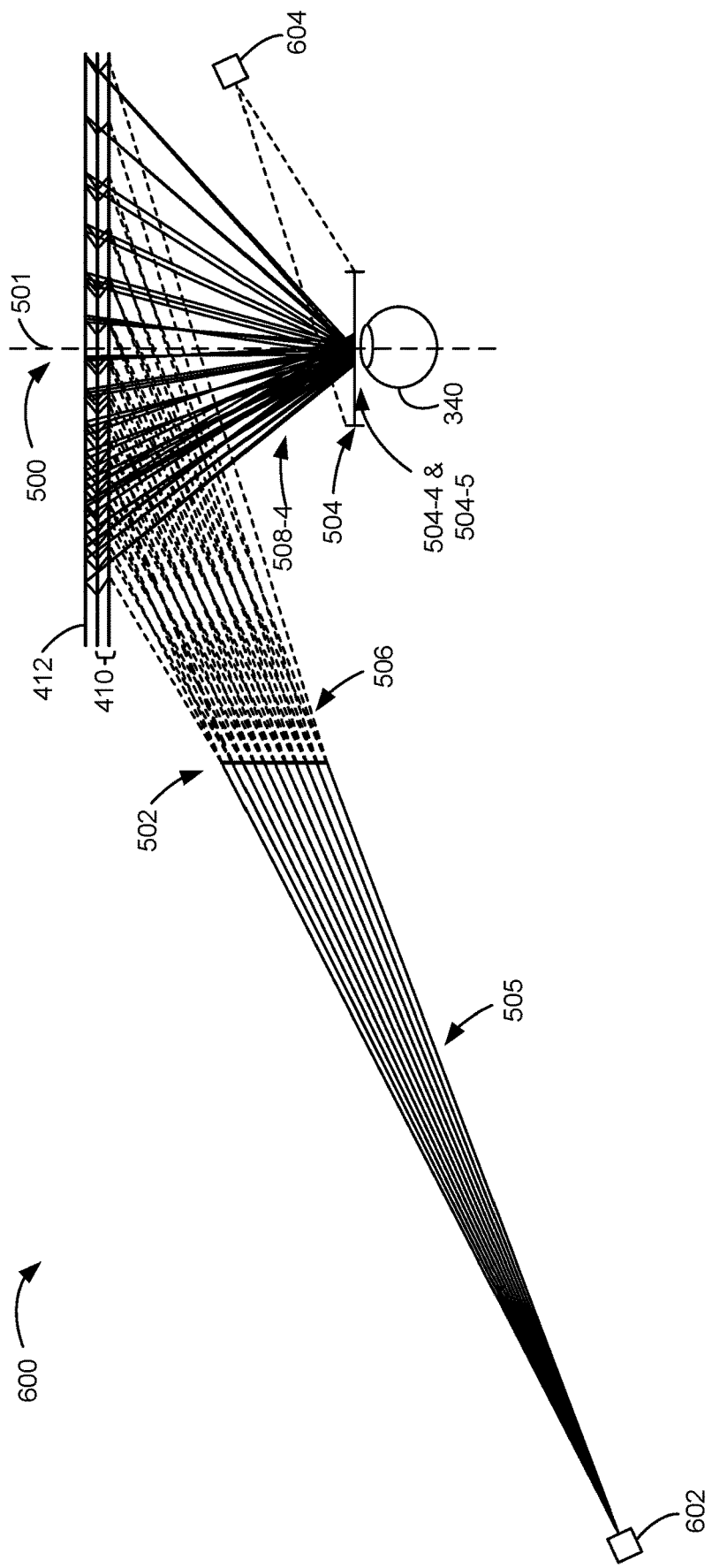
FIG. 6 is a schematic diagram illustrating a cross-sectional view of a display device in accordance with some embodiments.

FIG. 6 is a schematic diagram illustrating a cross-sectional view of display device 600 in accordance with some embodiments. Display device 600 includes beam steerer 500, SLM 502, and light source 602. In some embodiments, light source 602 includes one or more light emitting devices (e.g., one or more of LEDs, microLEDs, OLEDs, sLEDS, or any combination thereof). In some embodiments, light source 602 includes an array of light emitting device (e.g., an array of LEDs, and array of microLEDs, an array of OLEDs, an array of sLEDS, or any combination thereof). Light source 602 outputs light 505 toward SLM 502. SLM 502 receives light 505 and projects light 505 as modulated light 506 toward beam steerer 500. In some embodiments, SLM 502 includes an array of devices (e.g., pixels) that individually adjust the intensity or phase of light transmitted by each device. Modulated light 506 includes rays (e.g., diverging rays) originating from individual devices (e.g., pixels) of the array of SLM 502. Modulated light 506 is received by beam steerer 500 and redirected as light pattern 508-4 toward eyebox 504 such that light pattern 508-4 illuminates regions 504-4 and 504-5 of eyebox 504.

In some embodiments, beam steerer 500 of display device 600 is an optical combiner (e.g., combiner 900 described with respect to FIG. 9) configured to overlap one or more images output by SLM 502 with a real world view (e.g., ambient light transmitted through beam steerer 500).

In some embodiments, display device 600 also includes eye tracker 604 (e.g., an IR detector or camera). Eye tracker 604 is in communication with, or is part of, eye tracking module 217 described above with respect to FIG. 2. Eye tracker 604, together with eye tracking module 217, is configured to determine a position of a pupil of an eye of a user (e.g., eye 340). Eye tracker 604 detects IR light reflected off surface of eye 340 and, in accordance with the detected IR light, eye tracking module 217 determines the position of the pupil of eye 340. Consequently, eye tracking module 217 or processor(s) 216 in communication with eye tracking module 217 instructs beam steerer 500 to switch between different states so that a light pattern projected from HOE 412 illuminates a region of eyebox 504 corresponding to the position of the pupil of eye 340.

In some embodiments, as shown in FIG. 6, polarization-selective gratings 406 and 408 are configured to steer light impinging on polarization-selective gratings 406 and 408 at a large incident angle (e.g., an incident angle greater than 30 degrees, 40 degrees, 45 degrees, 50 degrees, or 60 degrees). Thus, an ambient light impinging on polarization-selective gratings 406 and 408 at a small incident angle (e.g., an incident angle less than 30 degrees, 40 degrees, 45 degrees, 50 degrees, or 60 degrees) is not steered by polarization-selective gratings 406 and 408. Thus, when beam steerer 600 is used as a combiner in a head-mounted display, beam steerer 600 may transmit the ambient light without steering the ambient light.

Figure 7A:
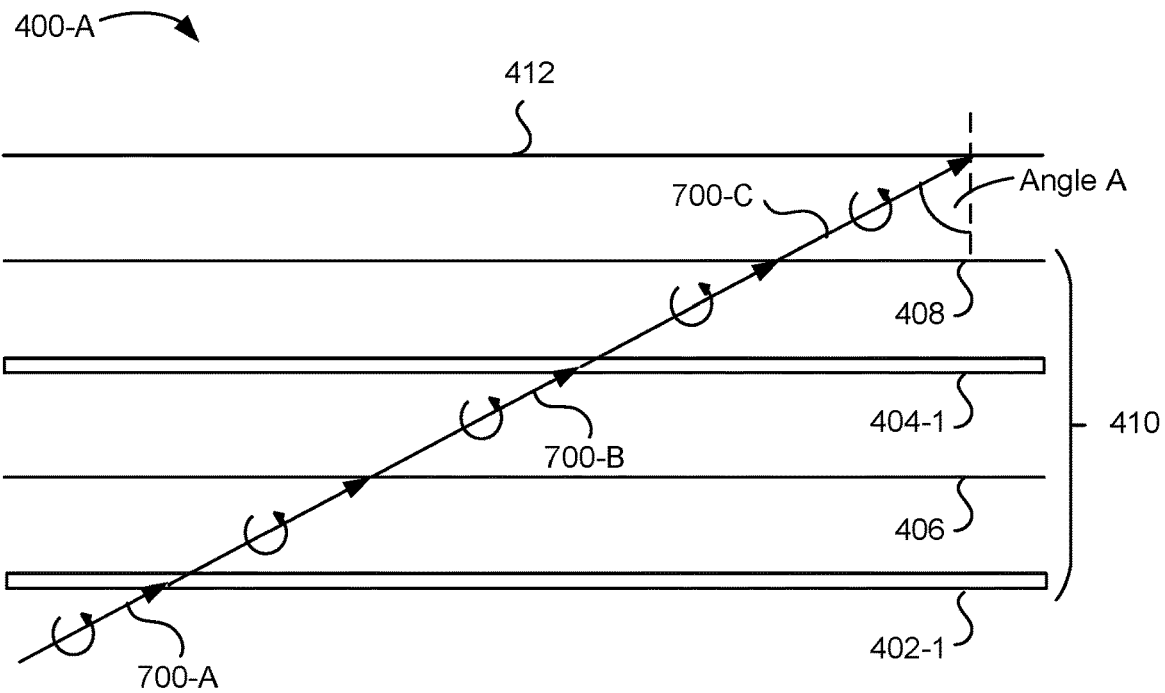
FIGS. 7A-7C are schematic diagrams illustrating propagation of light in the beam steerer of FIG. 4A in accordance with some embodiments.
Figure 7B:
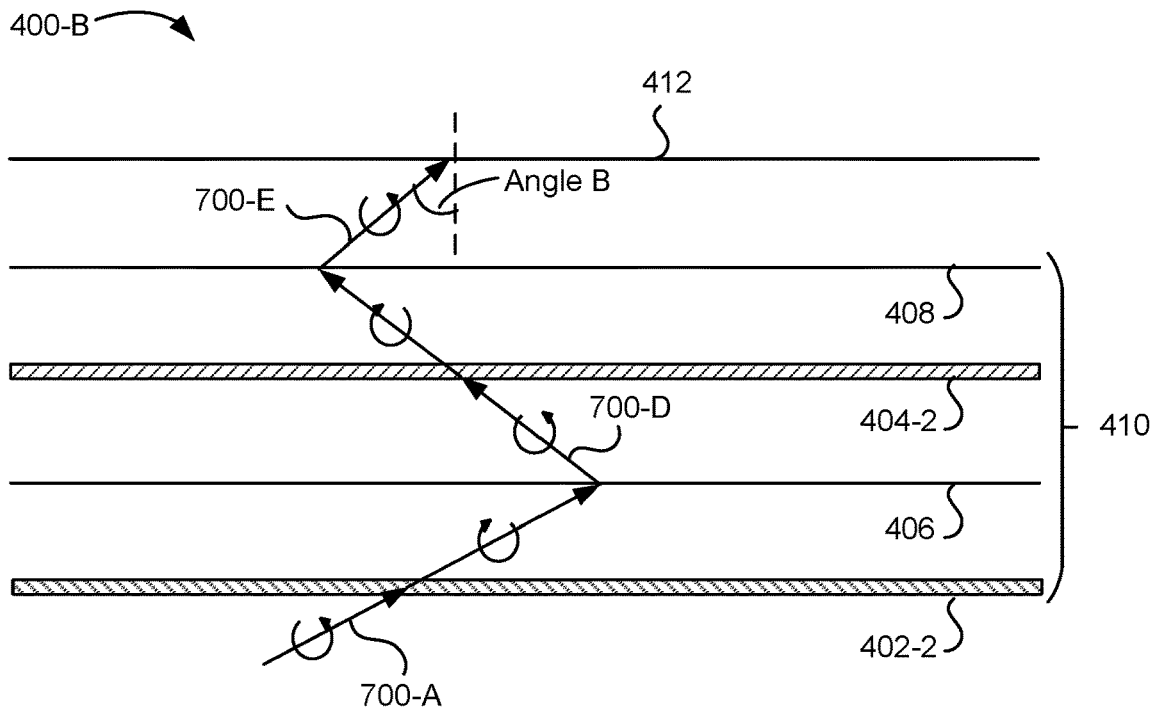
Figure 7C:
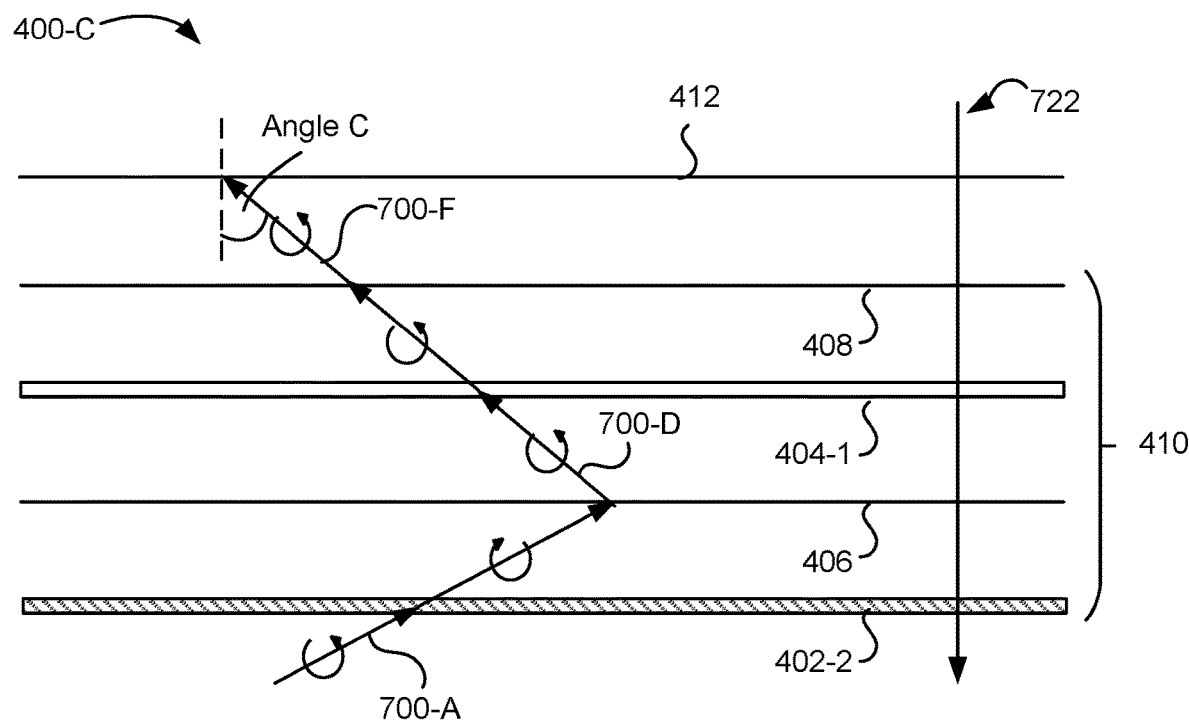

FIGS. 7A-7C are schematic diagrams illustrating propagation of light in beam steerer 400 in accordance with some embodiments. As described above, beam steerer 400 includes HOE 412 optically coupled with stack 410 including tunable retarder 402, polarization-selective grating 406, tunable retarder 404, and polarization-selective grating 408. Beam steerer 400 is switchable among three states, indicated as beam steerers 400-A, 400-B, and 400-C in FIGS. 7A, 7B, and 7C, respectively. The state of beam steerer 400 depends on a combination of states of tunable retarders 402 and 404. Tunable retarders 402 and 404 are individually switchable between two distinct states, an "off" state and an "on" state. Tunable retarders 402 and 404 in the "off" state are labeled as tunable retarders 402-1 and 404-1, and tunable retarders 402 and 404 in the "on" state are labeled as tunable retarders 402-2 and 402-2. Tunable retarders 402 and 404 are switchable between the different states by, for example, turning an applied voltage on and off. Tunable retarders 402-1 and 404-1 (in the first state) transmit light having circular polarization without changing the polarization and tunable retarders 402-2 and 402-2 (in the second state) transmit light having circular polarization while changing handedness of the circular polarization (e.g., right-handed circular polarization is converted to left-handed circular polarization and vice versa).

In FIGS. 7A-7C, polarization-selective grating 406 is configured to redirect (e.g., diffract) light having a first circular polarization and an incident angle within a first incident angle range while transmitting light having a second circular polarization or an incident angle outside the first incident angle range (or both). Polarization selective grating 408 is configured to redirect light having the first circular polarization and an incident angle within a second incident angle range while transmitting light having the second circular polarization or an incident angle outside the second incident angle range (or both). In some embodiments, polarization-selective gratings 406 and 408 have a same angle of diffraction (e.g., light having a first incident angle is diffracted in a first direction). In some embodiments, polarization-selective gratings 406 and 408 have distinct angles of diffractions (e.g., light having the first incident angle is diffracted in the first direction by polarization-selective grating 406 and in a distinct second direction by polarization-selective grating 408). The second circular polarization is orthogonal to the first circular polarization.

It is noted that in FIGS. 7A-7C, 8A-8E, and 9, polarization of light is annotated with universal annotations that do not take into account a propagation direction of a respective ray (e.g., the right-handed circularly polarized light is annotated with a counter-clockwise arrow regardless of the propagation direction of light, and the left-handed circularly polarized light is annotated with a clockwise arrow regardless of the propagation direction of light). It is also noted that FIGS. 7A-7C and FIGS. 8A-8E are described independently of each other. For example, a first direction in FIGS. 7A-7C is not necessarily a same direction as a first direction in FIGS. 8A-8E.

In FIG. 7A, beam steerer 400 in the first state (e.g., beam steerer 400-A) has tunable retarder 402 and tunable retarder 404 in the "off" state, labeled as tunable retarders 402-1 and 404-1. Tunable retarder 402-1 receives light 700-A in a first direction and transmits light 700-A having the first circular polarization without changing its polarization. Polarization selective grating 406 receives light 700-A having the first circular polarization and transmits light 700-A as light 700-B without changing the polarization or direction of the light. Tunable retarder 404-1 transmits light 700-B having the first circular polarization without changing its polarization. Polarization selective grating 408 receives light 700-B having the first circular polarization and transmits light 700-B as light 700-C without changing the polarization or direction of the light. Light 700-C is incident on HOE 412 at an incident angle having value A (e.g., Angle A in FIG. 7A). HOE 412 is configured to project light 700-C having incident angle A as a first light pattern (e.g., light pattern 508-1 in FIG. 5A).

In FIG. 7B, beam steerer 400 in the second state (e.g., beam steerer 400-B) has tunable retarder 402 and tunable retarder 404 in the "on" state, indicated as tunable retarders 402-2 and 404-2. Tunable retarder 402-2 receives light 700-A in the first direction and transmits light 700-A having the first circular polarization while changing the polarization from the first circular polarization to the second circular polarization. Polarization selective grating 406 receives light 700-A having the second circular polarization and redirects light 700-A as light 700-D in a second direction distinct from the first direction. Concurrently, polarization-selective grating 406 converts the polarization of light 700-D from the second circular polarization to the first circular polarization. Tunable retarder 404-2 receives light 700-D in the second direction and transmits light 700-D while changing the polarization from the first circular polarization to the second circular polarization. Polarization selective grating 408 receives light 700-D having the second circular polarization and redirects light 700-D as light 700-E in a third direction distinct from the first and the second directions. Concurrently, polarization-selective grating 408 converts the polarization of light 700-E from the second circular polarization to the first circular polarization. Light 700-E is incident on HOE 412 at an incident angle having value B distinct from value A (e.g., angle B in FIG. 7B). HOE 412 is configured to project light 700-B having incident angle B as a second light pattern (e.g., light pattern 508-2 in FIG. 5B).

In FIG. 7C, beam steerer 400 in the third state (e.g., beam steerer 400-C) has tunable retarder 402-2 in the "on" state and tunable retarder 404-1 in the "off" state. Tunable retarder 402-2 receives light 700-A in the first direction and transmits light 700-A having the first circular polarization while changing the polarization from the first circular polarization to the second circular polarization. Polarization selective grating 406 receives light 700-A having the second circular polarization and redirects light 700-A as light 700-D in the second direction. Concurrently, polarization-selective grating 406 converts the polarization of light 700-D from the second circular polarization to the first circular polarization. Tunable retarder 404-1 receives light 700-D in the second direction and transmits light 700-D without changing its polarization. Polarization selective grating 408 receives light 700-D having the first circular polarization and transmits light 700-D as light 700-F in the second direction without changing its polarization. Light 700-F is incident on HOE 412 at an incident angle having value C distinct from values A and B (e.g., angle C in FIG. 7C). HOE 412 is configured to project light 700-F having incident angle C as a third light pattern (e.g., light pattern 508-3 in FIG. 5C).

Additionally, beam steerer 400 has a state having tunable retarder 402-1 in the "off" state and tunable retarder 404-2 in the "on" state. However, in such a state, light 700-B having the second circular polarization and propagating in the first direction (e.g., as shown in FIG. 7A) impinges on polarization-selective grating 408 in an incident angle that may be outside the second incident angle range (e.g., in contrast to light 700-D impinging on polarization-selective grating 408 at an angle that is within the second incident angle range). Polarization selective grating 408 is configured to transmit light 700-B without changing its direction or polarization (because the incident angle is outside the second incident angle range). An optical path of light propagating through beam steerer 400 in such state is similar to the optical path of light 700 shown in FIG. 7A (except for the polarization), and such light is projected by HOE 412 as the first light pattern (e.g., light pattern 508-1 in FIG. 5A). As a result, beam steerer 400 having two tunable retarders coupled with respective polarization-selective gratings may have effectively three distinct states projecting three distinct light patters by HOE 412 (e.g., light patterns 508-1, 508-2, and 508-3).

FIG. 7C also illustrates an ambient light 722, which is transmitted through beam steerer 400. In beam steerer 400 with polarization selective gratings 406 and 408 configured for large incident angles, ambient light 722 impinges on polarization selective gratings 406 and 408 at small incident angles (e.g., incident angles less than a predefined incident angle range) and is transmitted through polarization selective gratings 406 and 408 without steering.

It is understood that the states of beam steerer 500 described with respect to FIGS. 7A-7C are used to describe example operations and configurations of beam steerer 500 and could be configured by any possible combination of tunable retarders 402 and 404 and polarization-selective gratings 406 an 408. For example, polarization-selective grating 406 may be selective with respect to light having the second circular polarization and polarization-selective grating 408 may be selective with respect to light having the first circular polarization.

FIGS. 8A-8E are schematic diagrams illustrating propagation of light in beam steerer 420 in accordance with some embodiments. Operations of tunable retarders 402 and 404, which are described with respect to FIGS. 7A-7C, are not repeated herein for brevity. In FIGS. 8A-8E, polarization-selective grating 426 (e.g., a PBP) is configured to redirect (e.g., diffract) light in a first direction having a first circular polarization in a second direction and light in the first direction having a second circular polarization in a third direction distinct from the first and second directions. For example, the second direction corresponds to a first positive order of diffraction and the third direction corresponds to a first negative order of diffraction. Polarization selective grating 428 is configured to redirect light in the first direction having the first circular polarization in a fourth direction and light in the first direction having the second circular polarization in a fifth direction distinct from the first direction and fourth directions. In some embodiments, polarization-selective gratings 426 and 428 have a same angle of diffraction (e.g., the second direction corresponds to the fourth direction and the third direction corresponds to the fifth direction). In some embodiments, polarization-selective gratings 426 and 428 have distinct angles of diffractions (e.g., the second direction is distinct from the fourth direction and the third direction is distinct from the fifth direction).

In some embodiments, beam steerer 420 also includes tunable retarder 422 and quarter waveplate 424 so that light transmitted through tunable retarder 422 and quarter waveplate 424 toward HOE 412 has a particular linear polarization (e.g., s polarization). This allows HOE 412 to provide a light pattern in case HOE 412 is configured to interact with (and diffract) light having the particular linear polarization (e.g., HOE 412 is a polarization-sensitive holographic optical element).

Figure 8A:
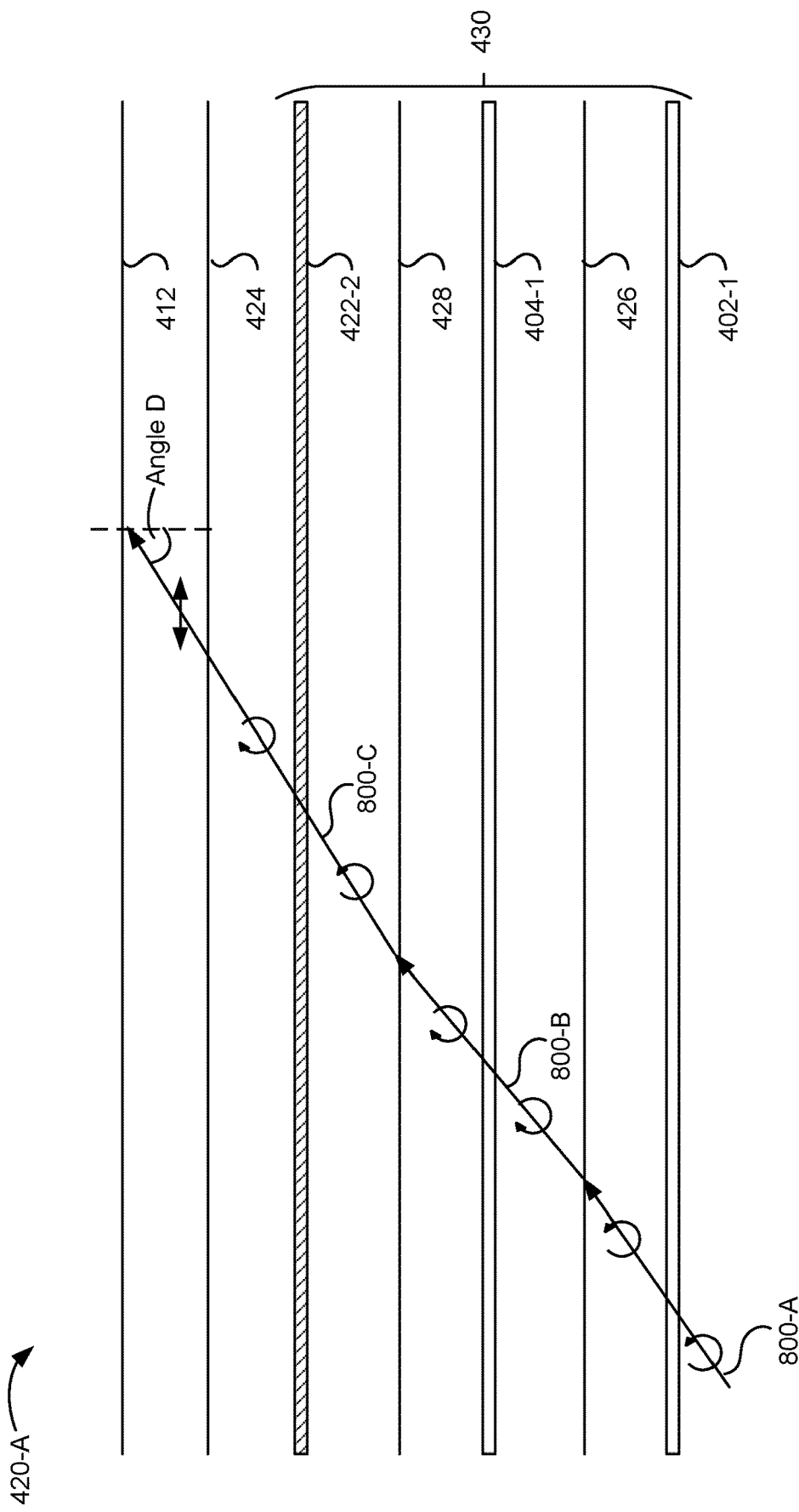
FIGS. 8A-8E are schematic diagrams illustrating propagation of light in the beam steerer of FIG. 4B in accordance with some embodiments.

In FIG. 8A, beam steerer 420 in the first state (e.g., beam steerer 420-A) has tunable retarder 402 and tunable retarder 404 in the "off" state (e.g., tunable retarders 402-1 and 404-1). Tunable retarder 402-1 receives light 800-A having the first circular polarization in a first direction and transmits light 800-A without changing its polarization. Polarization selective grating 426 receives light 800-A and redirects light 800-A as light 800-B in a second direction distinct from the first direction while converting the polarization from the first circular polarization to the second circular polarization. Tunable retarder 404-1 transmits light 800-B having the second circular polarization without changing its polarization. Polarization selective grating 428 receives light 800-B and redirects light 800-B as light 800-C in a third direction while converting the polarization from the second circular polarization to the first circular polarization. In some embodiments, tunable retarder 422 in the "on" state (e.g., tunable retarder 422-2), when included in beam steerer 420, transmits light 800-C while converting its polarization from the first circular polarization to the second circular polarization, and retarder 424 (e.g., a quarter waveplate), when included in beam steerer 420, converts the polarization of light 800-C from the second circular polarization to a linear polarization (e.g., s polarization). Light 800-C is incident on HOE 412 at an incident angle having value D (e.g., Angle D in FIG. 8A). HOE 412 is configured to project light 800-D having incident angle D as a first light pattern.

Figure 8B:
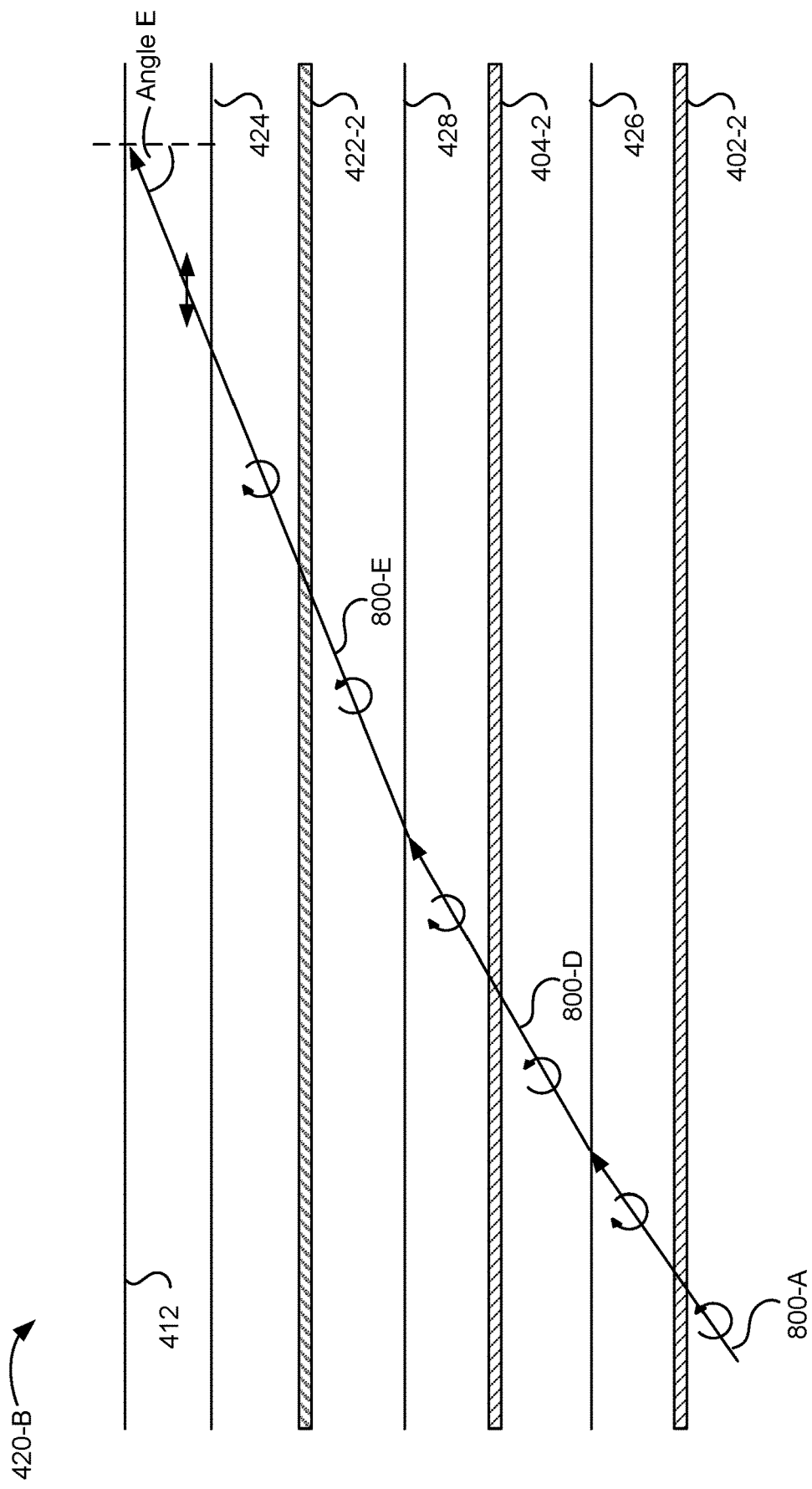

In FIG. 8B, beam steerer 420 in a second state (e.g., beam steerer 420-B) has tunable retarder 402 and tunable retarder 404 in the "on" state (e.g., tunable retarders 402-2 and 404-2). Tunable retarder 402-2 receives light 800-A having the first circular polarization in the first direction and transmits light 800-A while changing the polarization of light 800-A from the first circular polarization to the second circular polarization. Polarization selective grating 426 receives light 800-A having the second circular polarization and redirects light 800-A as light 800-D in a fourth direction distinct from the first and second directions while converting the polarization from the second circular polarization to the first circular polarization. Tunable retarder 404-2 transmits light 800-B while changing the polarization from the first circular polarization to the second circular polarization. Polarization selective grating 428 receives light 800-D having the second circular polarization and redirects light 800-D as light 800-E in a fifth direction distinct from the fourth direction and the third direction while converting its polarization from the second circular polarization to the first circular polarization. In some embodiments, tunable retarder 422 in the "on" state (e.g., tunable retarder 422-2), when included in beam steerer 420, transmits light 800-E while converting its polarization from the first circular polarization to the second circular polarization, and retarder 424, when included in beam steerer 420, converts the polarization of light 800-C from the second circular polarization to a linear polarization (e.g., s polarization). Light 800-E is incident on HOE 412 at an incident angle having value E distinct from value D (e.g., Angle E in FIG. 8B). HOE 412 is configured to project light 800-E having incident angle D as a second light pattern distinct from the first light pattern projected by beam steerer 420-A.

Figure 8C:
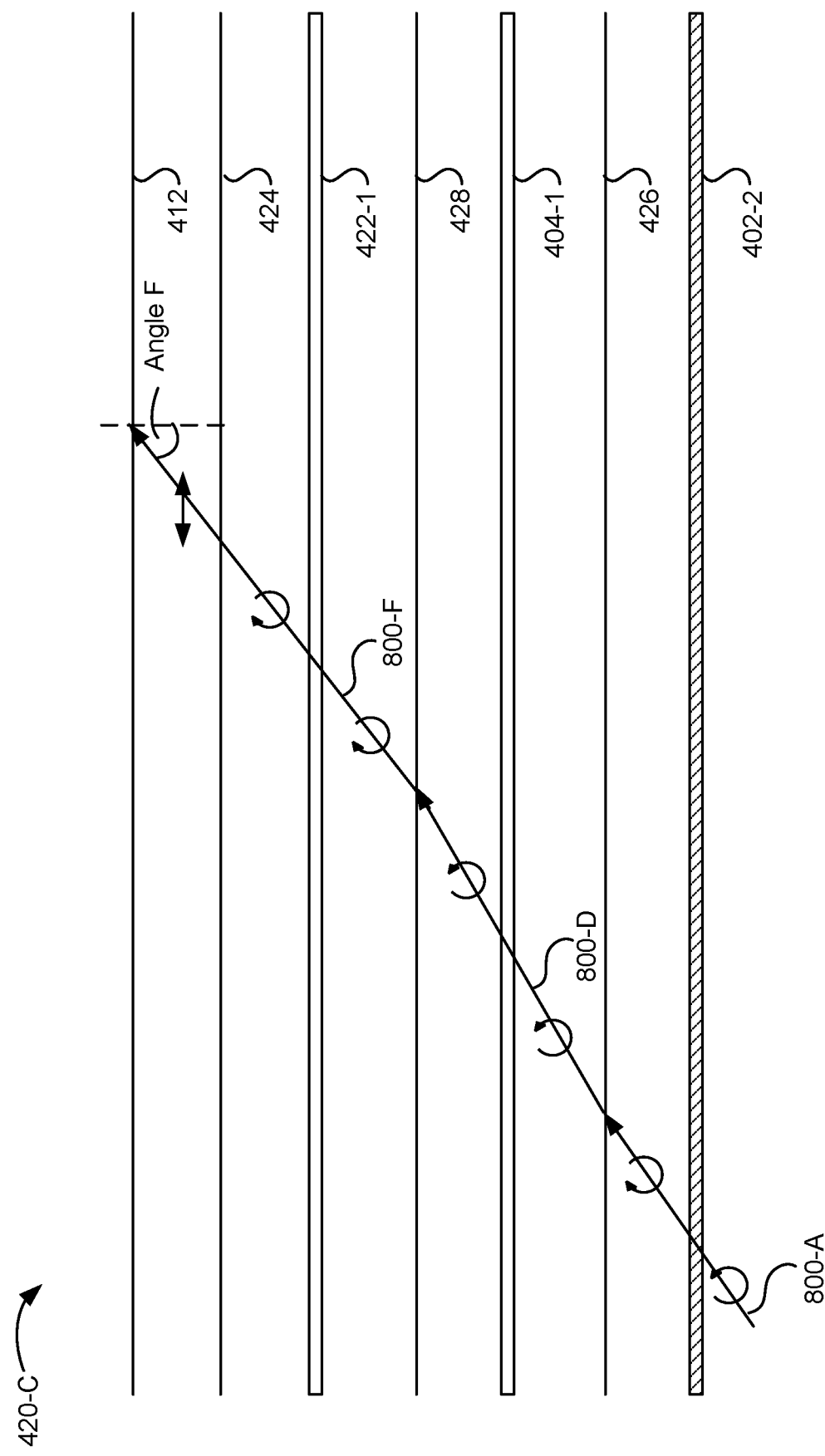

In FIG. 8C, beam steerer 420 in a third state (e.g., beam steerer 420-C) has tunable retarder 402 in the "on" state and tunable retarder 404 in the "off" state (e.g., tunable retarders 402-2 and 404-1). Tunable retarder 402-2 receives light 800-A having the first circular polarization in the first direction and transmits light 800-A while changing the polarization of light 800-A from the first circular polarization to the second circular polarization. Polarization selective grating 426 receives light 800-A having the second circular polarization and redirects light 800-A as light 800-D in the fourth direction while converting the polarization from the second circular polarization to the first circular polarization. Tunable retarder 404-1 transmits light 800-B without changing polarization. Polarization selective grating 428 receives light 800-D having the first circular polarization and redirects light 800-D as light 800-F in a sixth direction distinct from the third direction and the fifth direction. Concurrently, polarization-selective grating 428 converts the polarization of light 800-F from the first circular polarization to the second circular polarization. In some embodiments, tunable retarder 422 in the "off" state (e.g., tunable retarder 422-1), when included in beam steerer 420, transmits light 800-F while maintaining its polarization (e.g., the second circular polarization), and retarder 424, when included in beam steerer 420, converts the polarization of light 800-F from the second circular polarization to a linear polarization (e.g., s polarization). Light 800-F is incident on HOE 412 at an incident angle having value F (e.g., Angle F in FIG. 8C). Value F is distinct from values D and E. HOE 412 is configured to project light 800-F having incident angle F as a third light pattern distinct from the first light pattern projected by beam steerer 420-A and the second light pattern projected by beam steerer 420-B.

Figure 8D:
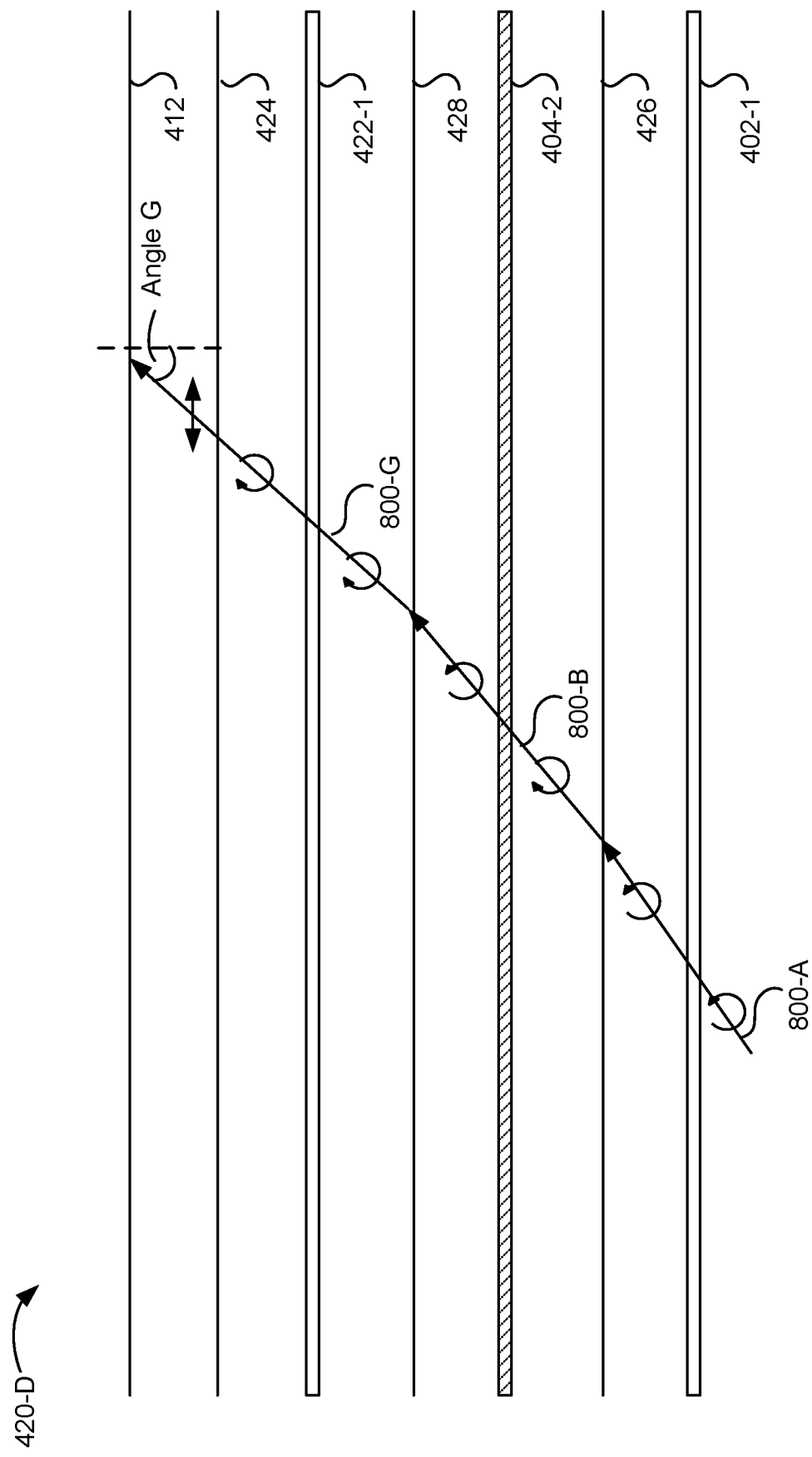

In FIG. 8D, beam steerer 420 in a fourth state (e.g., beam steerer 420-D) has tunable retarder 402 in the "off" state and tunable retarder 404 in the "on" state (e.g., tunable retarders 402-1 and 404-2). Tunable retarder 402-1 receives light 800-A having the first circular polarization in the first direction and transmits light 800-A without changing its polarization. Polarization selective grating 426 receives light 800-A having the first circular polarization and redirects light 800-A as light 800-B in the second direction while converting its polarization from the first circular polarization to the second circular polarization. Tunable retarder 404-2 transmits light 800-B while changing its polarization from the second circular polarization to the first circular polarization. Polarization selective grating 428 receives light 800-B having the first circular polarization and redirects light 800-B as light 800-G in a seventh direction while converting its polarization from the first circular polarization to the second circular polarization. The seventh direction is distinct from the third direction (e.g., light 800-C), the fifth direction (e.g., light 800-E), and the sixth direction (e.g., light 800-F). In some embodiments, tunable retarder 422 in the "off" state (e.g., tunable retarder 422-1), when included in beam steerer 420, transmits light 800-G while maintaining its polarization (e.g., the second circular polarization), and retarder 424, when included in beam steerer 420, converts the polarization of light 800-G from the second circular polarization to a linear polarization (e.g., s polarization). Light 800-G is incident on HOE 412 at an incident angle having value G (e.g., Angle G in FIG. 8D). Value G is distinct from values D, E, and F. HOE 412 is configured to project light 800-G having incident angle G as a fourth light pattern. The fourth light patterns is distinct from the first light pattern projected by beam steerer 420-A, the second light pattern projected by beam steerer 420-B, and the third light pattern projected by beam steerer 420-C.

Figure 8E:
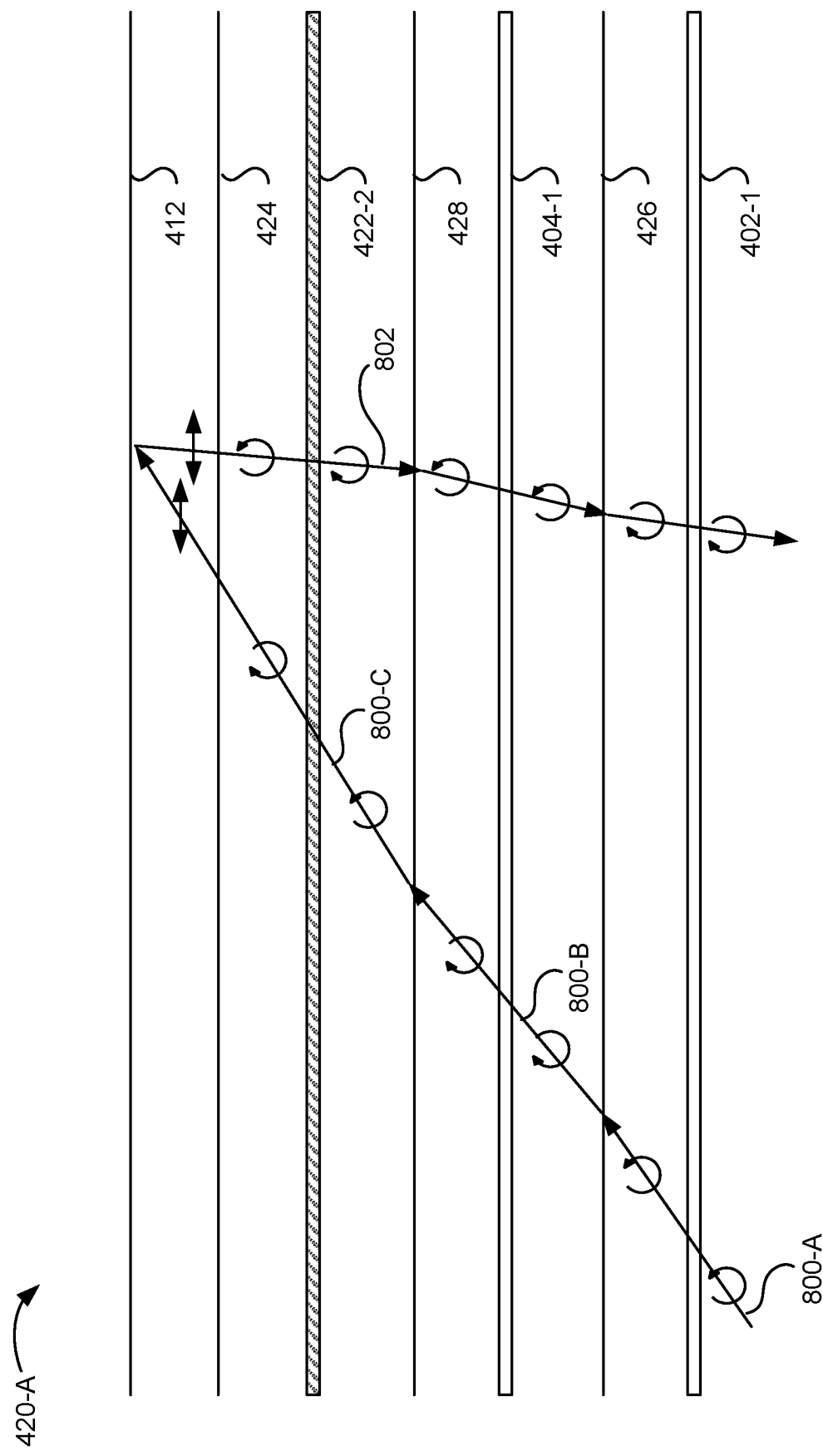

FIG. 8E illustrates propagation of light in beam steerer 820-1 in the first state. As explained with respect to FIG. 8A, light 800-A propagates through beam steerer 420-A and is received by HOE 412 as light 800-C at incident angle A. FIG. 8E further illustrates a ray (e.g., ray 802) of the first light pattern that is projected (e.g., reflected) from HOE 412 toward an eyebox (e.g., eyebox 504 in FIG. 5A). As shown, ray 802 is directed toward the eyebox via a different optical path than light 800-C received by HOE 412.

It is understood that the states of a beam steerer (e.g., beam steerer 400 or beam steerer 420 described with respect to FIGS. 7A-7C and 8A-8E, respectively) are distinct and mutually exclusive in that when the beam steerer is in a first state, the beam steerer is not in any other states, and thus, does not project any light pattern other than the first light pattern. For example, in some embodiments, when beam steerer 420-A is in the first state, light 800-A in a first direction is redirected to a second direction as light 800-B at polarization-selective grating 426 without being directed to any other directions. Furthermore, light 800-B in the second direction is redirected to a third direction as light 800-C at polarization-selective grating 428 without being directed to any other directions. Therefore, in some cases, HOE 412 receives light only at an incident angle D and HOE 412 projects a first light pattern (e.g., including ray 802 in FIG. 8E) without projecting any other light patterns.

Figure 9:
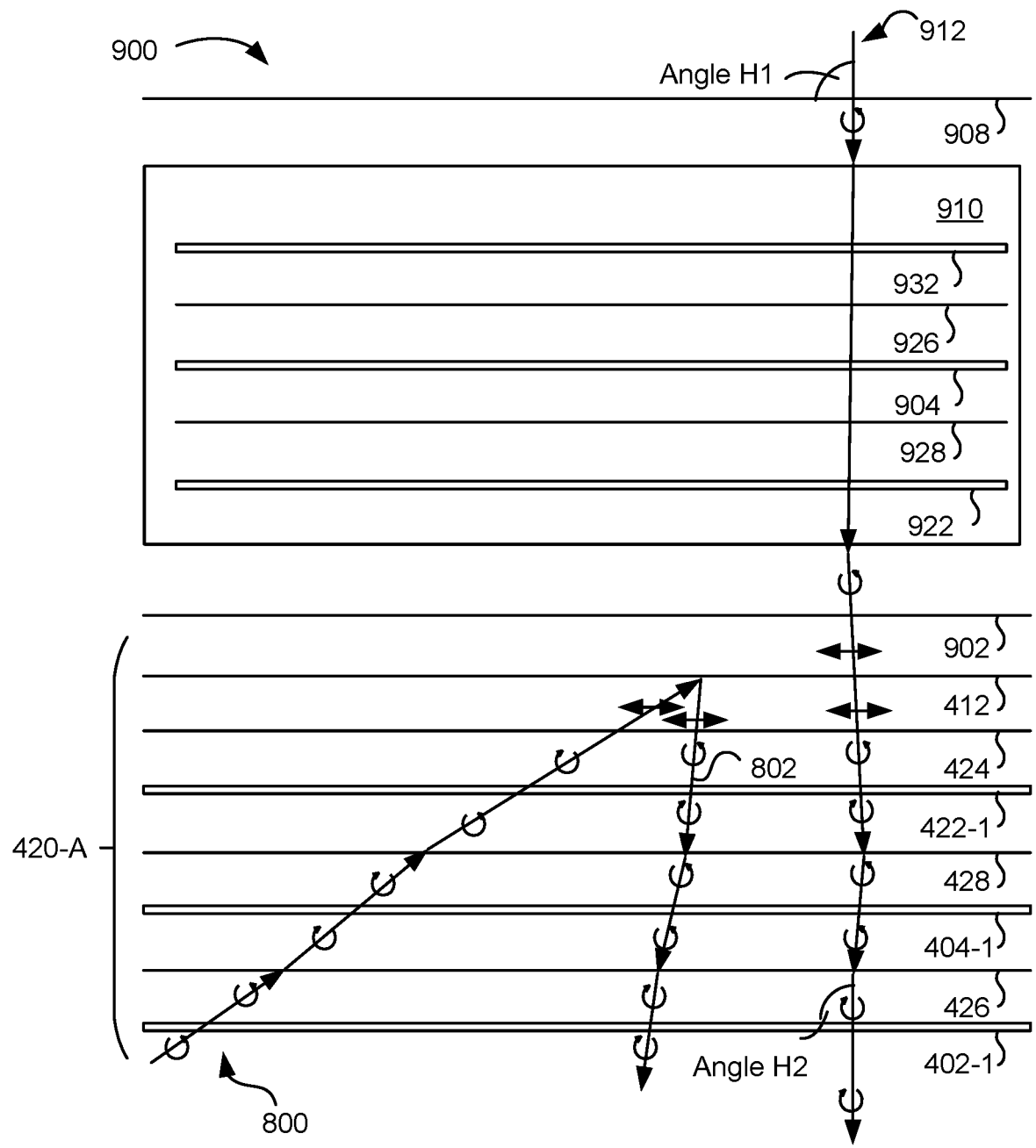
FIG. 9 is a schematic diagram illustrating propagation of light in a combiner in accordance with some embodiments.

FIG. 9 is a schematic diagram illustrating propagation of light in combiner 900 in accordance with some embodiments. Combiner 900 includes beam steerer 420-A (in the first state), retarder 902 (e.g., a quarter-wave plate), compensator 910, and polarizer 908. Polarizer 908 (e.g., an absorptive polarizer) is positioned as an outermost component away from an eye of a user (e.g., the eye of a user illustrated as eyebox 504 in FIG. 6) and a light source (e.g., light source 602 in FIG. 6). Compensator 910 is positioned between polarizer 908 and retarder 902. Retarder 902 is positioned between compensator 910 and HOE 412. Polarizer 908 receives (unpolarized) ambient light 912 from outside of combiner 900 and transmits a portion of ambient light 912 having a second circular polarization while absorbing light having polarization distinct from the second circular polarization. In some embodiments, polarizer 908 is a combination of a linear absorptive polarizer and a quarter waveplate. Compensator 910 receives a portion of ambient light 912 having the second circular polarization from polarizer 908 and redirects the portion of ambient light 912 through retarder 902 toward HOE 412. Compensator 910 includes a stack of polarization-selective gratings and tunable retarders corresponding to a stack of tunable retarders and polarization-selective gratings in beam steerer 420-A (e.g., stack 430 described with respect to FIG. 4B). In some embodiments, the stack of polarization-selective gratings and tunable retarders are arranged like a mirror image of the stack of tunable retarders and polarization-selective gratings in beam steerer 420-A relative to HOE 412. For example, compensator 910 shown in FIG. 9 includes tunable retarders 932, 904, and 922 and polarization selective gratings 926 and 928. Compensator 910 is configured to redirect the portion of ambient light 912 so that the portion of ambient light 912, after having transmitted through beam steerer 420-A, has a substantially same direction as the direction of ambient light 912 impinging on polarizer 908. For example, angle H1 defined by ambient light 912 and polarizer 908 is same or substantially same (e.g., within 15 degrees, 10 degrees, 5 degrees, or less) as angle H2 defined by ambient light 912 and tunable retarder 402, where tunable retarder 402 is parallel to polarizer 908. In some cases, compensator 910 reduces optical artifacts (e.g., chromatic aberrations) arising when ambient light 912 is diffracted by the polarization-selective gratings of beam steerer 420.

The beam steering device is also positioned so that at least one of the first light pattern or the second light pattern from the holographic optical element is received by the first polarization-selective optical element at one or more incident angles outside the predefined incident angle range and the at least one of the first light pattern and the second light pattern is transmitted without changing its direction (e.g., light patterns 508-1 and 508-2 are transmitted through polarization-selective grating 408 in FIGS. 5A and 5B, respectively).

FIGS. 10A-10D are schematic diagrams illustrating polarization volume hologram (PVH) grating 1000 in accordance with some embodiments. In some embodiments, PVH grating 1000 corresponds to polarization-selective gratings 406 and 408 described with respect to FIG. 4A. FIG. 10A illustrates a three dimensional view of PVH grating 1000 with incoming light 1004 entering the lens along the z-axis. FIG. 10B illustrates an x-y-plane view of PVH grating 1000 with a plurality of cholesteric liquid crystals (e.g., liquid crystals 1002-1 and 1002-2) with various orientations. The orientations (e.g., represented by azimuthal angles θ) of the liquid crystals are constant along reference line AA' along the x-axis, as shown in FIG. 10D illustrating a detailed plane view of the liquid crystals along the reference line. The orientations of the liquid crystals in FIG. 10B vary along the y-axis. The pitch defined as a distance along the y-axis at which the azimuth angle of a liquid crystal has rotated 180 degrees is constant throughout the grating. FIG. 10C illustrates a y-z-cross-sectional view of PVH grating 1000. PVH grating 1000 has helical structures 1008 with helical axes aligned corresponding to the x-axis. The helical structures create a volume grating with a plurality of diffraction planes (e.g., planes 1010-1 and 1010-2) extending across the grating. In FIG. 10C, diffraction planes 1010-1 and 1010-2 are tilted with respect to the z-axis. Helical structures 1008 define the polarization selectivity of PVH grating 1000, as light with circular polarization handedness corresponding to the helical axes is diffracted while light with circular polarization with the opposite handedness is not diffracted. Helical structures 1008 also define the wavelength selectivity of PVH grating 1000, as light with wavelength close to a helical pitch (e.g., helical pitch 1012 in FIG. 10C) is diffracted while light with other wavelengths is not diffracted.

In some embodiments, polarization-selective gratings 406 and 408 described with respect to FIG. 4A are cholesteric liquid crystal (CLC) gratings. A CLC grating has similar optical properties to those described with respect to PVH grating 1000. A CLC and PVH both include cholesteric liquid crystals in helical arrangements. CLC grating further includes a photoalignment layer and the CLCs are arranged to helical structures in accordance with the photoalignment layer. In contrast, in a PVH grating CLCs are arranged to helical structures in accordance with holographic recording.

Figure 11C:
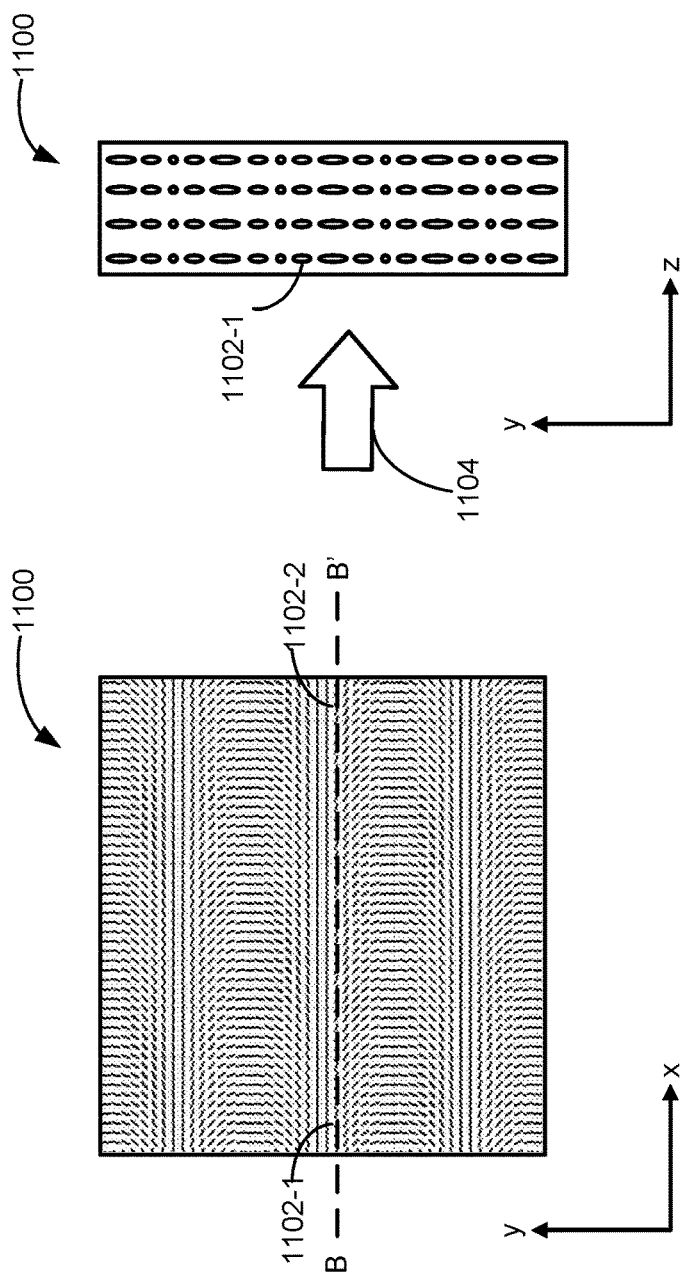
FIGS. 11A-11D are schematic diagrams illustrating a Pancharatnam-Berry phase (PBP) grating in accordance with some embodiments.
Figure 11C:
Figure 11B:
Figure 11D:
Figure 11A:
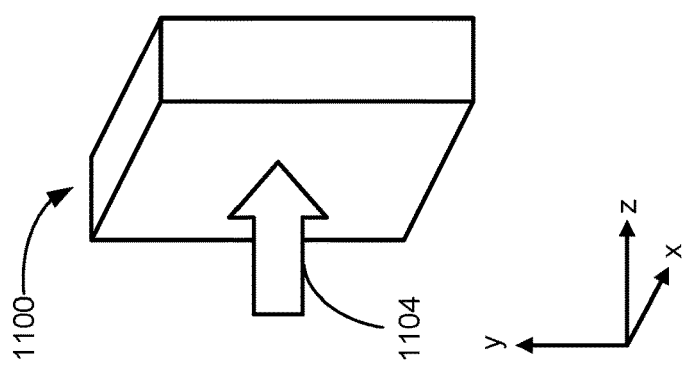

FIGS. 11A-11D are schematic diagrams illustrating Pancharatnam-Berry phase (PBP) grating 1100 in accordance with some embodiments. In some embodiments, PBP grating 1100 corresponds to polarization-selective gratings 426 and 428 described with respect to FIG. 4B. FIG. 11A illustrates a three dimensional view of PBP grating 1100 with incoming light 1104 entering the lens along the z-axis. FIG. 11B illustrates an x-y-plane view of PBP grating 1100 showing a plurality of liquid crystals (e.g., liquid crystals 1102-1 and 1102-2) with various orientations in the PBP grating 1100. The orientations (i.e., azimuthal angles θ) of the liquid crystals are constant along reference line between B and B' along the x-axis, as shown in FIG. 11D illustrating a detailed plane view of the liquid crystals along the reference line. The orientations of the liquid crystals in FIG. 11B vary along the y-axis while the pitch defined as a distance along the y-axis at which the azimuth angle of a liquid crystal has rotated 180 degrees is constant throughout the grating. FIG. 11C illustrates an y-z-cross-sectional view of PBP grating 1100. As shown in FIG. 11C, the orientations of the liquid crystal (e.g., liquid crystal 1102-1) remain constant along the z-direction.

In light of these principles, we now turn to certain embodiments.

In accordance with some embodiments, an optical assembly includes a beam steering device and a holographic optical element (e.g., beam steerer 400 includes stack 410 and HOE 412 in FIG. 4A). The beam steering device is switchable between different states including a first state and a second state (e.g., beam steerer 400-A and 400-B in FIGS. 7A-7B). The beam steering device includes a first polarization-selective optical element (e.g., polarization-selective grating 406) and a first tunable optical retarder (e.g. tunable retarder 402) optically coupled with the first polarization-selective optical element. The holographic optical element is positioned relative to the beam steering device for receiving light from the beam steering device (e.g. light 506 in FIG. 5A) and projecting a first light pattern (e.g., light pattern 508-1 in FIG. 5A) while the beam steering device is in the first state and a second light pattern (e.g., light pattern 508-2 in FIG. 5B) distinct from the first light pattern while the beam steering device is in the second state.

In some embodiments, the first polarization-selective optical element is positioned between the first tunable optical retarder and the holographic optical element (e.g., polarization-selective grating 406 is positioned between tunable retarder 402 and HOE 412 in FIG. 4A).

In some embodiments, while the beam steering device is in the first state, the first tunable optical retarder transmits light impinging on the first tunable optical retarder without changing its polarization (e.g., FIG. 7A). While the beam steering device is in the second state, the first tunable optical retarder transmits the light impinging on the first tunable optical retarder while converting its polarization (e.g., FIG. 7B).

In some embodiments, the first light pattern from the holographic optical element is configured to illuminate a first region of an eyebox (e.g., region 504-1 in FIG. 5A). The second light pattern from the holographic optical element is configured to illuminate a second region distinct from the first region of the eyebox (e.g., region 504-2 in FIG. 5B).

In some embodiments, the first polarization-selective optical element (e.g., PVH grating 1000 in FIGS. 10A-10D) is configured to receive light having a first polarization and transmit the light having the first polarization toward the holographic optical element in a first direction without changing its direction (e.g., FIG. 7A). The first polarization-selective optical element is configured to receive light having a second polarization and redirect the light having the second polarization toward the holographic optical element in a second direction distinct from the first direction (e.g., by changing its direction) (e.g., FIG. 7B).

In some embodiments, the first polarization-selective optical element is a polarization volume hologram (e.g., PVH grating 1000 shown in FIGS. 10A-10D). In some embodiments, the first polarization-selective optical element is a geometric phase diffractive element (e.g., PBP grating 1100 shown in FIGS. 11A-11D).

In some embodiments, the beam steering device is positioned so that at least one of the light having the first polarization and the light having the second polarization is received by the first polarization-selective optical element at one or more incident angles within a predefined incident angle range (e.g., polarization-selective grating 406 receives light 700-A having a second circular polarization at an incident angle that is within a particular range of incident angles that polarization-selective grating 406 is configured to redirect, as shown in FIG. 7B). The beam steering device is also positioned so that at least one of the first light pattern or the second light pattern from the holographic optical element is received by the first polarization-selective optical element at one or more incident angles outside the predefined incident angle range and the at least one of the first light pattern and the second light pattern is transmitted without changing its direction (e.g., light patterns 508-1 and 508-2 are transmitted through polarization-selective grating 406 in FIGS. 5A and 5B, respectively).

In some embodiments, the beam steering device also includes a second polarization-selective optical element and a second tunable optical retarder (e.g., polarization-selective grating 408 and tunable retarder 404 in FIG. 4A). The second tunable optical retarder is optically coupled with the second polarization-selective optical element so that the second tunable optical retarder is positioned between the first polarization-selective optical element and the second polarization-selective optical element.

In some embodiments, the holographic optical element is configured to project a third light pattern distinct from the first light pattern and the second light pattern while the beam steering device is in a third state different from the first state and the second state (e.g., FIG. 5C).

In some embodiments, while the beam steering device is in the first state, the first tunable optical retarder and the second tunable optical retarder are configured to transmit light without converting its polarization, while the beam steering device is in the second state, the first tunable optical retarder and the second tunable optical retarder are configured to convert light having a first polarization to light having a second polarization distinct from the first polarization, and while the beam steering device is in the third state, the first tunable optical retarder is configured to convert light having the first polarization to light having the second polarization and the second tunable optical retarder is configured to transmit light without converting its polarization (e.g., FIGS. 7A-7C).

In some embodiments, the first polarization-selective optical element (e.g., PBP grating 1100 shown in FIGS. 11A-11D) is configured to receive light having a first polarization and redirect the light having the first polarization toward the holographic optical element in a third direction while converting polarization of the light having the first polarization to, for example, a second polarization (e.g., FIG. 8A). The first polarization-selective optical element is also configured to receive light having a second polarization and redirect the light having the second polarization toward the holographic optical element in a fourth direction different from the third direction while converting polarization of the light having the second polarization to, for example, the first polarization (e.g., FIG. 8A).

In some embodiments, the optical assembly further includes an additional tunable optical retarder (e.g., tunable retarder 424 in FIG. 4B) positioned between the holographic optical element and the beam steering device. The additional tunable optical retarder transmits light from the first polarization-selective optical element to the holographic optical element.

In some embodiments, the optical assembly further includes a quarter-wave plate (e.g., retarder 424 in FIG. 4B) positioned between the additional tunable optical retarder and the holographic optical element.

In some embodiments, the beam steering device (e.g., beam steerer 420 in FIGS. 8A-8D) also includes a third polarization-selective optical element and a third tunable optical retarder optically coupled with the third polarization-selective optical element so that the second tunable optical retarder is positioned between the first polarization-selective optical element and the third polarization-selective optical element. The holographic optical element is configured to project a fourth light pattern while the beam steering device is in a fourth state and a fifth light pattern while the beam steering device is in a fifth state, where the first state, the second state, the fourth state, and the fifth state are distinct from one another.

In some embodiments, the optical assembly further includes a compensator including a fourth polarization-selective optical element (e.g., compensator 910 including one or more polarization-selective gratings, such as polarization-selective grating 926 as shown in FIG. 9). The compensator has a first side and an opposing second side. The first side is facing the holographic optical element. The compensator is configured to receive, through the second side, ambient light propagating toward the first side in a particular direction distinct from the third direction and the fourth direction. The compensator is also configured to redirect the ambient light such that the ambient light, after passing through the holographic optical element and the beam steering device, propagates in the particular direction (e.g., angle H2 has a value that is same or substantially same as value of angle H1 in FIG. 9). In some embodiments, the optical assembly further includes a polarizer and a quarter-wave plate (e.g., polarizer 908 and retarder 902 in FIG. 9).

In accordance with some embodiments, a display device (e.g., display device 600 in FIG. 6) includes the optical assembly described above (e.g., beam steerer 500), a light source (e.g., light source 602), and a spatial light modulator (e.g., SLM 502). The spatial light modulator is positioned so that the spatial light modulator receives light output by the light source and projects the light toward the optical assembly.

In some embodiments, the light source and the spatial light modulator are positioned away from an optical axis of the optical assembly (e.g., axis 501 in FIG. 6).

In accordance with some embodiments, a beam steering device (e.g., beam steerer 400 in FIG. 4A) is switchable between different states including a first state and a second state. The beam steering device includes a first polarization-selective optical element and a first tunable optical retarder optically coupled with the first polarization-selective optical element so that the beam steering device directs light impinging on the beam steering device into a first direction while in the first state and directs the light impinging on the beam steering device into a second direction distinct from the first direction while in the second state. The beam steering device also includes a holographic optical element (e.g., HOE 412) positioned relative to the beam steering device so that the holographic optical element projects light impinging on the holographic optical element as a first light pattern while the beam steering device is in the first state and the light impinging on the holographic optical element as a second light pattern that is distinct from the first light pattern while the beam steering device is in the second state (e.g., FIGS. 5A and 5B).

In some embodiments, the beam steering device (e.g., beam steerer 40 in FIG. 4A) further includes a second tunable optical retarder optically coupled with the second polarization-selective optical element, so that the second polarization-selective optical element is positioned between the first tunable optical retarder and the second tunable optical retarder. The holographic optical element is positioned to receive, from the beam steering device in a third state, third light in a third direction distinct from the first and the second direction and project the third light as a third light pattern distinct from the first light pattern and the second light pattern (e.g., FIGS. 5A-5C).

In some embodiments, the holographic optical element is also positioned to receive, from the beam steering device in a fourth state, fourth light in a fourth direction distinct from the first, the second, and the third direction and project the fourth light as a fourth light pattern distinct from the first light pattern, the second light pattern, and the third light pattern.

In accordance with some embodiments, a method is performed at an optical assembly (e.g., beam steerer 500 in FIGS. 5A-5E) including a holographic optical element and a beam steering device switchable between different states including a first state and a second state. The beam steering device includes a first polarization-selective optical element and a first tunable optical retarder optically coupled with the first polarization-selective optical element. The method includes receiving, by the holographic optical element, light from the beam steering device. The method also includes projecting, by the holographic optical element, a first light pattern while the beam steering device is in the first state and a second light pattern distinct from the first light pattern while the beam steering device is in the second state.

In some embodiments, the method further includes transmitting, while the beam steering device is in the first state, by the first tunable optical retarder, light impinging on the first tunable optical retarder without changing its polarization (e.g., FIG. 7A). The method also includes transmitting, while the beam steering device is in the second state, by the first tunable optical retarder, the light impinging on the first tunable optical retarder while converting its polarization (e.g., FIG. 7B).

In some embodiments, the method further includes illuminating a first region of an eyebox with the first light pattern from the holographic optical element and illuminating a second region distinct from the first region with the second light pattern from the holographic optical element (e.g., regions 504-1 and 504-2 in FIGS. 5A and 5B, respectively).

In some embodiments, the method includes receiving, by the first polarization-selective optical element, light having a first polarization and transmitting the light having the first polarization toward the holographic optical element in a first direction without changing its direction (e.g., FIG. 7A). The method also includes receiving, by the first polarization-selective optical element, light having a second polarization and redirecting the light having the second polarization toward the holographic optical element in a second direction distinct from the first direction (e.g., by changing its direction) (e.g., FIG. 7B).

Although various drawings illustrate operations of particular components or particular groups of components with respect to one eye, a person having ordinary skill in the art would understand that analogous operations can be performed with respect to the other eye or both eyes. For brevity, such details are not repeated herein.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An optical assembly comprising:
    a beam steering device switchable between different states including a first state and a second state, the beam steering device including a first polarization-selective optical element and a first tunable optical retarder optically coupled with the first polarization-selective optical element; and
    a holographic optical element positioned relative to the beam steering device for receiving light from the beam steering device and projecting a first light pattern while the beam steering device is in the first state and a second light pattern distinct from the first light pattern while the beam steering device is in the second state, wherein:
        the first polarization-selective optical element is configured to:
            receive light having a first polarization and transmit the light having the first polarization toward the holographic optical element in a first direction; and
            receive light having a second polarization and redirect the light having the second polarization toward the holographic optical element in a second direction distinct from the first direction;
        the beam steering device is positioned so that at least one of the light having the first polarization and the light having the second polarization is received by the first polarization-selective optical element at one or more incident angles within a predefined incident angle range; and
        the first polarization-selective optical element is positioned to receive at least one of the first light pattern and the second light pattern from the holographic optical element at one or more incident angles outside the predefined incident angle range so that the first polarization-selective optical element transmits the at least one of the first light pattern and the second light pattern.

2. The optical assembly of claim 1, wherein the first polarization-selective optical element is positioned between the first tunable optical retarder and the holographic optical element.

3. The optical assembly of claim 1, wherein:
    while the beam steering device is in the first state, the first tunable optical retarder transmits light impinging on the first tunable optical retarder without changing its polarization; and
    while the beam steering device is in the second state, the first tunable optical retarder transmits the light impinging on the first tunable optical retarder while converting its polarization.

4. The optical assembly of claim 1, wherein:
    the first light pattern from the holographic optical element is configured to illuminate a first region of an eyebox; and
    the second light pattern from the holographic optical element is configured to illuminate a second region distinct from the first region of the eyebox.

5. The optical assembly of claim 1, wherein:
    the beam steering device also includes:
        a second polarization-selective optical element; and
        a second tunable optical retarder optically coupled with the second polarization-selective optical element, so that the second tunable optical retarder is positioned between the first polarization-selective optical element and the second polarization-selective optical element.

6. The optical assembly of claim 5, wherein:
    the holographic optical element is configured to project a third light pattern distinct from the first light pattern and the second light pattern while the beam steering device is in a third state different from the first state and the second state.

7. The optical assembly of claim 6, wherein:
    the first tunable optical retarder and the second tunable optical retarder are configured to transmit light without converting its polarization while the beam steering device is in the first state;
    the first tunable optical retarder and the second tunable optical retarder are configured to convert light having a first polarization to light having a second polarization distinct from the first polarization while the beam steering device is in the second state; and
    the first tunable optical retarder is configured to convert light having the first polarization to light having the second polarization and the second tunable optical retarder is configured to transmit light without converting its polarization while the beam steering device is in the third state.

8. The optical assembly of claim 1, wherein the first polarization-selective optical element is configured to:
receive light having a first polarization and redirect the light having the first polarization toward the holographic optical element in a third direction; and
receive light having a second polarization and redirect the light having the second polarization toward the holographic optical element in a fourth direction different from the third direction.

9. The optical assembly of claim 8, further including:
an additional tunable optical retarder positioned between the holographic optical element and the beam steering device.

10. The optical assembly of claim 9, further including:
a quarter-wave plate positioned between the additional tunable optical retarder and the holographic optical element.

11. The optical assembly of claim 8, wherein:
the beam steering device also includes:
a third polarization-selective optical element; and
a third tunable optical retarder optically coupled with the third polarization-selective optical element so that the third tunable optical retarder is positioned between the first polarization-selective optical element and the third polarization-selective optical element; and
the holographic optical element is configured to project a fourth light pattern while the beam steering device is in a fourth state and a fifth light pattern while the beam steering device is in a fifth state, the first state, the second state, the fourth state, and the fifth state being distinct from each other.

12. The optical assembly of claim 8, further including:
a compensator including a fourth polarization-selective optical element, the compensator having a first side and an opposing second side, wherein the first side is facing the holographic optical element, and the compensator is configured to:
receive, through the second side, ambient light propagating toward the first side in a particular direction distinct from the third direction and the fourth direction; and
redirect the ambient light such that the ambient light, after passing through the holographic optical element and the beam steering device, propagates in the particular direction.

13. A display device, comprising:
the optical assembly of claim 1;
a light source; and
a spatial light modulator positioned so that the spatial light modulator receives light output by the light source and projects the light toward the optical assembly.

14. The display device of claim 13, wherein the light source and the spatial light modulator are positioned away from an optical axis of the optical assembly.

15. The optical assembly of claim 1, wherein:
the holographic optical element is positioned relative to the beam steering device for projecting the first light pattern toward the first polarization-selective optical element while the beam steering device is in the first state and the second light pattern toward the first polarization-selective optical element while the beam steering device is in the second state.

16. A method, comprising:
at an optical assembly including a holographic optical element and a beam steering device switchable between different states including a first state and a second state, the beam steering device including a first polarization-selective optical element and a first tunable optical retarder optically coupled with the first polarization-selective optical element:
receiving, by the first polarization-selective optical element, light having a first polarization at one or more incident angles within a predefined incident angle range and transmitting the light having the first polarization toward the holographic optical element in a first direction;
receiving, by the first polarization-selective optical element, light having a second polarization at one or more incident angles within the predefined incident angle range and redirecting the light having the second polarization toward the holographic optical element in a second direction distinct from the first direction;
receiving, by the holographic optical element, light from the beam steering device;
projecting, by the holographic optical element, a first light pattern while the beam steering device is in the first state and a second light pattern distinct from the first light pattern while the beam steering device is in the second state so that the first polarization-selective optical element receives at least one of the first light pattern and the second light pattern from the holographic optical element and transmits at least one of the first light pattern and the second light pattern; and
receiving, by the first polarization-selective optical element, at least one of the first light pattern or the second light pattern at one or more incident angles outside the predefined incident angle range so that the first polarization-selective optical element transmits the at least one of the first light pattern or the second light pattern.

17. The method of claim 16, further including:
while the beam steering device is in the first state, transmitting, by the first tunable optical retarder, light impinging on the first tunable optical retarder without changing its polarization; and
while the beam steering device is in the second state, transmitting, by the first tunable optical retarder, the light impinging on the first tunable optical retarder while converting its polarization.

18. The method of claim 16, further including:
illuminating a first region of an eyebox with the first light pattern from the holographic optical element; and
illuminating a second region distinct from the first region with the second light pattern from the holographic optical element.

* * * * *